(12) United States Patent
Akutsu

(10) Patent No.: US 8,015,807 B1
(45) Date of Patent: Sep. 13, 2011

(54) SPHERE CIRCULATING APPARATUS

(76) Inventor: Ichiro Akutsu, Saitama (JP)

( * ) Notice: Subject to any disclaimer, the term of this patent is extended or adjusted under 35 U.S.C. 154(b) by 0 days.

(21) Appl. No.: 13/069,844

(22) Filed: Mar. 23, 2011

(30) Foreign Application Priority Data

Apr. 16, 2010 (JP) ................ 2010-094653

(51) Int. Cl.
*F03B 17/02* (2006.01)
*F02B 63/04* (2006.01)
*F03G 7/08* (2006.01)

(52) U.S. Cl. .............. 60/495; 60/496; 290/1 R
(58) Field of Classification Search ........... 60/495, 60/496
See application file for complete search history.

(56) References Cited

U.S. PATENT DOCUMENTS

| | | | | |
|---|---|---|---|---|
| 3,857,242 | A * | 12/1974 | Gilmore | 60/495 |
| 7,134,283 | B2 * | 11/2006 | Villalobos | 60/639 |
| 2005/0127681 | A1 * | 6/2005 | Shaochun | 290/54 |
| 2009/0235659 | A1 * | 9/2009 | Lin | 60/495 |
| 2010/0180587 | A1 * | 7/2010 | Manakkattupadeettathil | 60/495 |

FOREIGN PATENT DOCUMENTS

JP 2008-064084 3/2008

OTHER PUBLICATIONS

Notification of Reasons for Refusal issued Aug. 8, 2010 in corresponding Japanese Application No. 2010-094653.

* cited by examiner

*Primary Examiner* — Thomas Denion
*Assistant Examiner* — Christopher Jetton
(74) *Attorney, Agent, or Firm* — Myers Wolin, LLC

(57) ABSTRACT

A sphere circulating apparatus capable of extracting a falling motion energy of a plurality of spheres circulating with repeatedly falling and rising within the apparatus, in which each sphere falls in a falling chamber, dives into liquid at a second liquid surface formed at a lower end of the falling chamber and rises in a rising chamber by the buoyancy force while pushing upward-opening check valves open one after another; each sphere then rises up to a first liquid surface formed at an upper end aperture of the rising chamber and pushes another sphere at the upper end aperture out from the first liquid surface; each sphere pushed out further shifts to an upper end aperture of the falling chamber and falls in the falling chamber toward the second liquid surface.

10 Claims, 20 Drawing Sheets

Prior Art

SPHERE CIRCULATING APPARATUS

CROSS REFERENCE TO RELATED APPLICATIONS

This application claims priority under 35 USC 119 to Japanese Patent Application No. 2010-94653, filed on Apr. 16, 2010, now Japanese Patent No. 4608598, the disclosure of which is expressly incorporated herein by reference in its entireties.

FIELD OF THE INVENTION

The present invention relates to a sphere circulating apparatus capable of extracting a falling motion energy of a plurality of spheres circulating via repeated falls and rises within the apparatus.

BACKGROUND OF THE INVENTION

In recent years, deterioration of global environment has received attention, inter alia occurrence of global warming has become a serious problem. In order to suppress progress of the global warming, warming preventive measures therefore have been discussed. As one factor of such global warming, $CO_2$ emission is mentioned, for which various specific measures have been proposed to proceed with the suppression of the $CO_2$ emission.

As measures for suppressing the $CO_2$ emission, there has been proposed to take means for preventing the $CO_2$ emission from the beginning other than reducing the emission amount of $CO_2$. For this means, electric power generation is mentioned taking advantage of a reproducible energy such as sunlight, wind power or wave power existing in the natural field, where not only the suppression of the $CO_2$ emission in a currently operating thermal plants but also the enhancement of the electric power generation amount by using such a reproducible energy have been carried out.

However, upon taking advantage of such a reproducible energy, e.g. for acquiring an electric power from sunlight energy, a sunlight electric power generation (solar energy generation) system is required to be set up. This solar energy generation system requires solar batteries for directly converting solar energy to electric power. The solar energy generation system itself provides no $CO_2$ emission, highly contributing to emission constraints, where it is disadvantageous that the solar batteries are still expensive for the solar energy generation system with incurring a high setup cost.

Thus, even though the use of the reproducible energy contributes to the $CO_2$ emission constraints, it is accompanied by not only a high setup cost but also restrictions of setup places.

SUMMARY OF THE INVENTION

It is accordingly an object of the present invention to provide a sphere circulating apparatus taking advantage of a motion or kinetic energy of a sphere's natural fall and capable of extracting a falling motion energy from a plurality of spheres circulating via repeated falls and rises within the apparatus.

In order to achieve the above-mentioned object, a sphere circulating apparatus according to the present invention comprises: a liquid storage chamber having a seal plug at an upper end portion and a lower end aperture at a lower end portion, in which the chamber is filled with liquid up to at least a predetermined height; a rising chamber in which the liquid is held up to an upper end aperture of an upper end portion of the rising chamber at the predetermined height to form a first liquid surface and a plurality of spheres, each having a predetermined weight, fed from a lower end aperture at a lower end portion of the rising chamber are sequentially passed through at least two upward-opening check valves arranged at intervals and risen up to the upper end aperture; a falling chamber having an upper end aperture at an upper end portion connected to the upper end aperture of the rising chamber through a first communication chamber, thereby allowing the spheres sequentially fed from the upper end aperture of the rising chamber to naturally fall up to a lower end aperture of a lower end portion of the falling chamber; a liquid storage box having a second communication chamber mutually communicating the lower end apertures of the liquid storage chamber, the rising chamber and the falling chamber to form, at the lower aperture of the falling chamber, a second liquid surface into which the spheres having fallen within the falling chamber dive, guide means for sequentially guiding the spheres dived to the lower end aperture of the rising chamber and a drain port aligned with a level of the second liquid surface in side walls of the box; and a supply pipe connected to the upper end portion of the rising chamber to automatically supply liquid to the upper end portion of the rising chamber from a liquid supply device when a level of the first liquid surface is lowered; wherein each of the spheres rises by a buoyancy force within the rising chamber, so that the rising spheres are pushed up beyond the upper end aperture of the rising chamber by buoyancy forces of other spheres and fed to the upper end aperture of the falling chamber, where the spheres fed naturally fall within the falling chamber, dive under the second liquid surface and are then fed to the lower end aperture of the rising chamber by the guide means whereby each of the spheres is sequentially circulated between the rising chamber and the falling chamber.

Also, in one aspect of the sphere circulating apparatus according to the present invention, the falling chamber has at least two downward-opening check valves arranged at intervals, and the spheres sequentially fed from the upper end aperture of the rising chamber naturally fall up to the lower end aperture of the falling chamber by passing through each of the downward-opening check valves.

A sphere circulating apparatus according to the present invention adopts an arrangement in which a first and a second liquid surface having different liquid levels from each other are formed within the apparatus and the levels of the liquid surfaces can be maintained, so that a plurality of spheres are sequentially and naturally fallen or dropped from the first liquid surface having a higher liquid level to the second liquid surface having a lower liquid level, then the spheres dived or rushed into the second liquid surface are guided and then risen by each sphere's buoyancy force toward the first liquid surface, from which each one of the spheres is naturally fallen subject to the buoyancy forces by other spheres, whereby natural falls and rises of the spheres are repeated in the apparatus. For means rising the spheres to a higher place enough for the natural fall, spheres' buoyancy forces are used, so that without supplying energy for the circulation from the outside of the apparatus the circulations of the spheres are maintained only by supplementing liquid, thereby enabling fall motion energies of the spheres to be easily extracted.

Also, as far as the supplementation of liquid is continued, the spheres can be kept circulated and the fall motion energy of the spheres are kept generated, so that independently of climate conditions such as wind or sunshine on which the reproducible energy depends, the fall motion energies of the spheres can be kept extracted at anytime during all hours.

Additionally, the implementation of the sphere circulation can be made by employing commercially available materials made of synthetic resin, so that the apparatus can be manufactured at a low cost. It is also advantageous that the installation location is not restricted if liquid can be supplied to the apparatus. For example, it can be installed in an architectural structure such as a detached house or a condominium building, where rain liquid having been preliminarily saved can be used for the liquid to be supplemented to the apparatus, so that it becomes unnecessary to prepare a special liquid source, which also serves for resource saving measures. In lack of rain liquid, the liquid can be supplemented from a liquid supply pipe coming into an architectural structure.

The sphere circulating apparatus according to the present invention largely attends to a $CO_2$ emission problem since no $CO_2$ is emitted, and a cheaper apparatus can be manufactured since there is no specific restriction for installation locations.

DETAILED DESCRIPTION OF THE EMBODIMENTS

A sphere circulating apparatus according to the present invention will now be described referring to the figures, where water is taken as a typical example of liquid described above.

The sphere circulating apparatus according to the present invention is arranged such that two water surfaces having different water levels from each other are formed within the apparatus and the levels of the water surfaces can be maintained, so that a plurality of spheres are sequentially and naturally fallen from a first water surface having a higher water level to a second water surface having a lower water level, then the spheres dived into the second water surface are guided and then risen by each sphere's buoyancy force toward the first water surface, from which each sphere is naturally fallen subject to the buoyancy forces' pushing forces by the other spheres, whereby motion energies of the natural falls according to the plurality of spheres circulated via repeated falls and rises within the apparatus are extracted.

Before describing embodiments of the sphere circulating apparatus according to the present invention, a principle as to how two water surfaces of mutually different water levels are formed in the apparatus will be described referring to FIGS. 1-4.

Figure 1:
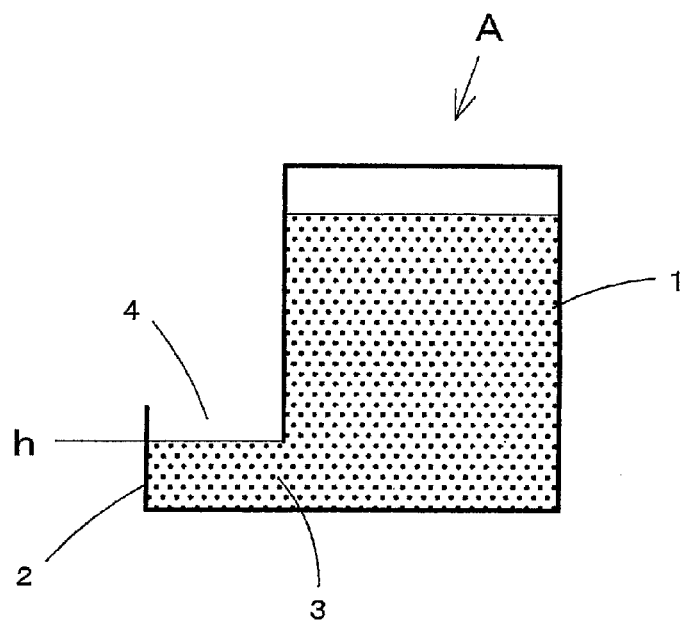
FIG. 1 is a schematic cross-sectional view for illustrating a water supply principle in an automatic waterer.

FIG. 1 shows a longitudinal-sectional view of an automatic waterer (water supply device) A automatically supplied with water depending on a water level decreased as a chicken, dog, cat or the like drinks the water. The automatic waterer A is composed of a hollow container body 1 and a tap portion 2, where the tap portion 2 is communicated with the container body 1 through a communication aperture 3 to hold a water surface allowing the water to be drunk.

At first, in order to store the water in the automatic waterer A, the automatic waterer A itself is inclined so that the tap portion 2 may take an upper position, and water is poured from a tap 4 until filled up inside the container body 1. When restoring the automatic waterer A to the original horizontal position, the water inside the container body 1 is held since the upper portion of the container body 1 is originally in the sealed state, whereby as shown in FIG. 1, the water surface at the tap 4 is maintained at a water level h as shown.

When an animal or the like drinks the water from the tap 4, the water level of the tap portion 2 becomes lower than the upper end of the communication aperture 3, air is supplied to the inside of the container body 1 through the communication aperture 3. As a result, the water in the container body 1 flows into the tap portion 2 through the communication aperture 3 and the water level in the upper portion of the container body 1 is lowered, where the water level in the tap portion 2 is again maintained at the upper end of the aperture 3.

Thus, only if the water is held in the sealed state in the inside of the container body 1 in the automatic waterer A, the water surface in the tap portion 2 is always maintained at the fixed water level even though the tap 4 is in the atmospheric pressure.

Figure 2:
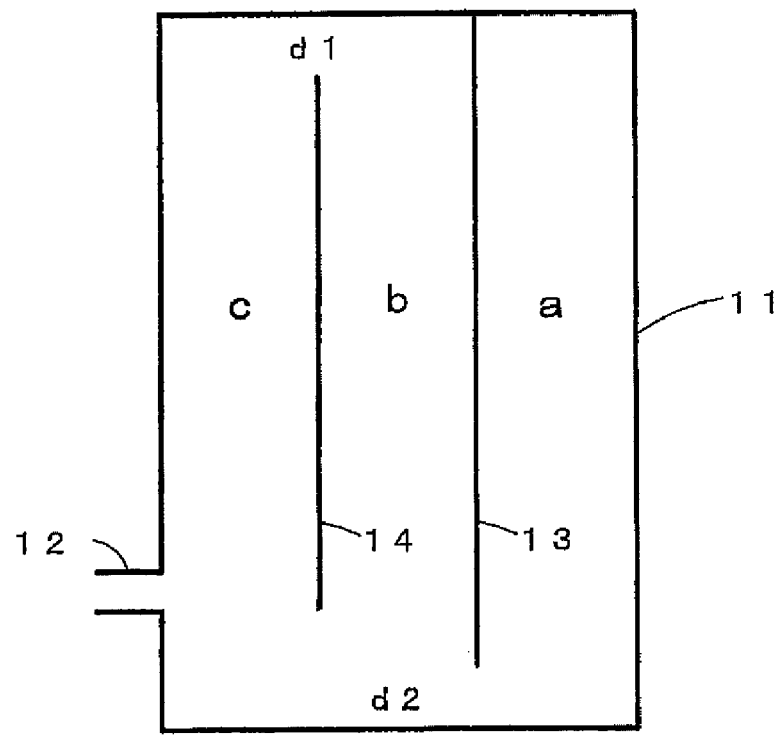
FIG. 2 is a schematic cross-sectional view for illustrating an apparatus for internally forming two water surfaces having different water levels from each other.

Taking advantage of the basic principle of the above automatic water supply, an apparatus forming water surfaces having mutually different water levels at two apertures in the atmospheric pressure is shown in FIG. 2.

In the apparatus shown in FIG. 2, the internal space of a container body 11 of a vertically long-rectangular parallelepiped is partitioned into three chambers a, b, and c with two bulkhead plates 13 and 14 adhered to side walls of the container body 11. The upper end of the bulkhead plate 13 is adhered to a top panel of the container body 11 and the lower end thereof is spaced from a bottom panel of the container body 11. The upper end of the bulkhead plate 14 is spaced from the top panel of the container body 11 and the lower end thereof is also spaced from the bottom panel of the container body 11.

As shown in FIG. 2, by the arrangement of the two bulkhead plates 13 and 14, the upper portion of the chamber a is sealed and the lower portion thereof is provided with a lower end aperture. At each upper portion of the chambers b and c an upper end aperture is formed, thereby forming a communication chamber d1 communicating the upper end apertures of the chambers b and c in the upper portion of the container body 11. Also at each lower portion of the chambers a, b, and c, a lower end aperture is formed, thereby forming a communication chamber d2 communicating the lower end apertures of the chambers a, b, and c inside the container body 11. Furthermore, at a lower portion of a side wall of the chamber c in the container body 11 a water supply/drain port 12 is provided at a position as shown, thereby communicating the internal space of the container body 11 with the external atmosphere.

Figure 3:
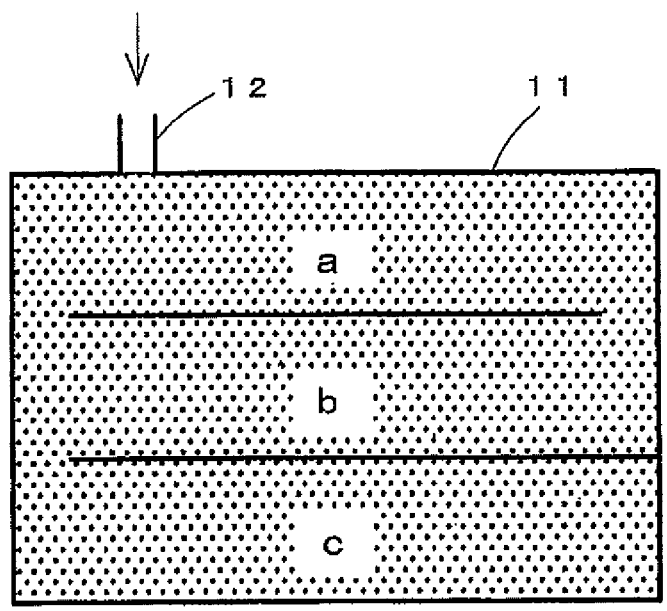
FIGS. 3(a) and 3(b) are schematic cross-sectional views for illustrating states after the apparatus of FIG. 2 has been supplied with water.
Figure 3:
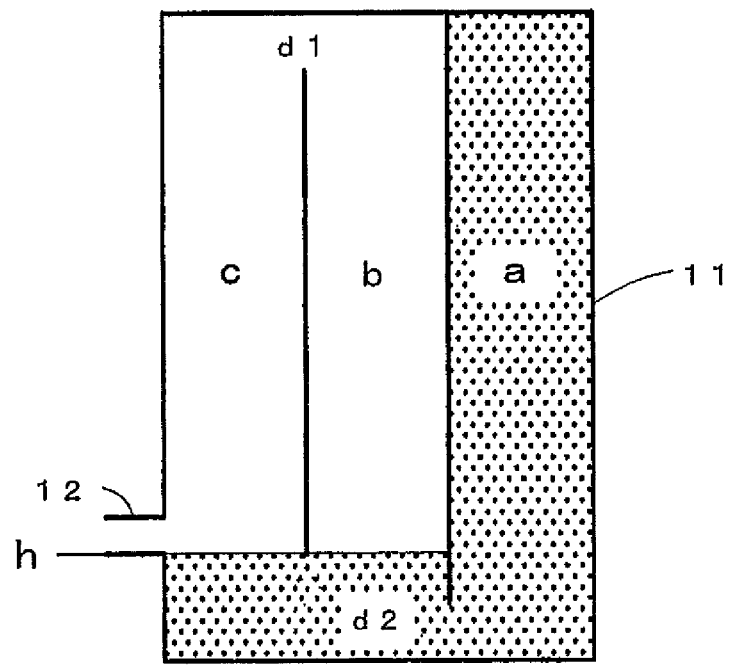

With the apparatus shown in FIG. 2, the procedure forming two water surfaces in the apparatus will be described referring to FIG. 3. First, as shown in FIG. 3(*a*), the apparatus itself is turned so that the water supply/drain port 12 may be positioned at the top. Then, from the water supply/drain port 12, water is supplied to the chambers a, b and c in this order to have the container body 11 filled with water. Once the container body 11 is filled up with water, the apparatus is restored to the original state. In the course of the restoration, the waters in the chambers b and c flow out of the water supply/drain port 12.

The state after the restoration is shown in FIG. 3(*b*). The chamber a is erected while the upper portion remains in the sealed state, so that the water in the chamber (water storage chamber) a is entirely held on the same principle as the apparatus A shown in FIG. 1. The water in the chamber b communicating with the communication chamber d2 does not flow out, so that the water level in the chamber b is maintained at the upper end aperture thereof, thereby tentatively forming a first water surface. Meanwhile, the water in the chamber c flows out to the outside from the water supply/drain port 12 with the inflow of air to the chamber c from the water supply/drain port 12, where as the chamber a communicating through the communication chamber d2 is in the sealed state, the water level of the chamber c is maintained at the position of h as shown, i.e. at the lower end of the aperture of the water supply/drain port 12, thereby forming a second water surface.

While in the upper end aperture of the chamber b, the first water surface is temporarily formed, the upper end apertures of the chambers b and c are communicated with each other through the communication chamber d1 that is under the atmospheric pressure, so that on the principle of a communication pipe the water in the chamber b flows into the chamber c through the communication chamber d2. Therefore, the water having flowed into the chamber c flows out to the outside from the water supply/drain port 12, finally resulting in that the first water surface formed in the chamber b and the second water surface formed in the chamber c are maintained at the position of h as shown, i.e. at the same water level.

As described above, the apparatus shown in FIG. 2 can not form therein two water surfaces of mutually different water levels. Therefore, an apparatus which is adapted to have two water surfaces of mutually different water levels formed in the apparatus in FIG. 2 is shown in FIG. 4.

Figure 4:
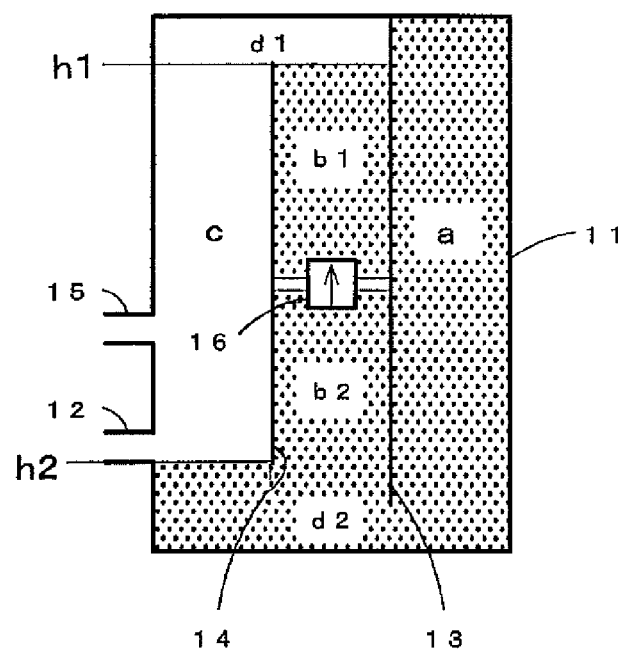
FIG. 4 is a schematic cross-sectional view for illustrating an aspect how two water surfaces having deferent water levels from each other are formed in another example having improved the apparatus of FIG. 2.

The arrangement of the apparatus shown in FIG. 4 is based on the apparatus in FIG. 2, where the same portions are assigned the same reference numerals. Difference of the apparatus in FIG. 4 from the one in FIG. 2 is that in the middle of the chamber b there is provided an upward-opening check valve 16.

The upward-opening check valve 16 serves to operate that it is easily opened in case of an upward flow or in the presence of rising spheres by their buoyancy forces while it is closed to block the falling water in case of a downward flow or in the absence of the rising spheres. It is to be noted that the upward-opening check valve 16 divides the chamber b into chambers b1 and b2 in the vertical direction.

When the apparatus in FIG. 4 is laid on its side to be filled up with water and then restored, the upper portion of the water storage chamber a is still in the sealed state, so that the water in the chamber c and the water in the communication chamber d1 are flowed out to the outside from the water supply/drain port 12, from which air is flowed in, where at the lower end aperture of the chamber c the second water surface at a water level h2 is formed and then the waters in the chambers b1 and b2 are held without flowing into the communication chamber d2 in the presence of the upward-opening check valve 16. As a result, at the upper end aperture of the chamber b1 the first water surface at a water level h1 is formed. Between the first and the second water surfaces there is a water level difference substantially corresponding to the height of the bulkhead plate 14.

It has been thus found that the apparatus in FIG. 4 can form two water surfaces having mutually different water levels. Specifically, as shown, an insertion port 15 for inserting spheres into an upper portion of the chamber (falling chamber) c in the container body 11 is provided. The mounting location of the insertion port 15 is assumed to have a sufficient height for allowing the spheres to fall onto, and dive into and under the second water surface formed at the lower end aperture in the falling chamber c.

A sphere inserted from the insertion port 15 naturally falls within the falling chamber c, dives into the second water surface and dives under the water surface. Then, the sphere proceeds to the lower end of the chamber (rising chamber) b1 by its diving force, rises in the rising chamber b2 by a buoyancy force of the sphere itself and opens the upward-opening check valve 16 by the buoyancy force.

At a moment when the rising sphere opens the upward-opening check valve 16, the rising chamber b1 is communicated with the rising chamber b2, where the communication chamber d1 is in the atmospheric pressure, so that the waters in the rising chambers b1 and b2 flow into the falling chamber c through the communication chamber d1, with the result that the water in the rising chamber b is to be dropped, assuming the state shown in FIG. 3(b). It is found that such an apparatus shown in FIG. 4 is disadvantageous in that two water surfaces of mutually different water levels enabling the spheres to be circulated can not be kept formed.

First Embodiment

Accordingly, the above disadvantage is now solved by providing the apparatus shown in FIG. 4 with means not communicating the rising chamber b1 with the rising chamber b2 when the rising spheres open the upward-opening check valve as well as an automatic water supply device capable of supplying water when the first water surface at the upper end aperture of the rising chamber b1 is lowered or decreased. A sphere circulating apparatus according this first embodiment which allows a plurality of spheres to circulate within the apparatus with repeatedly falling and rising is shown in FIG. 5.

Figure 5:
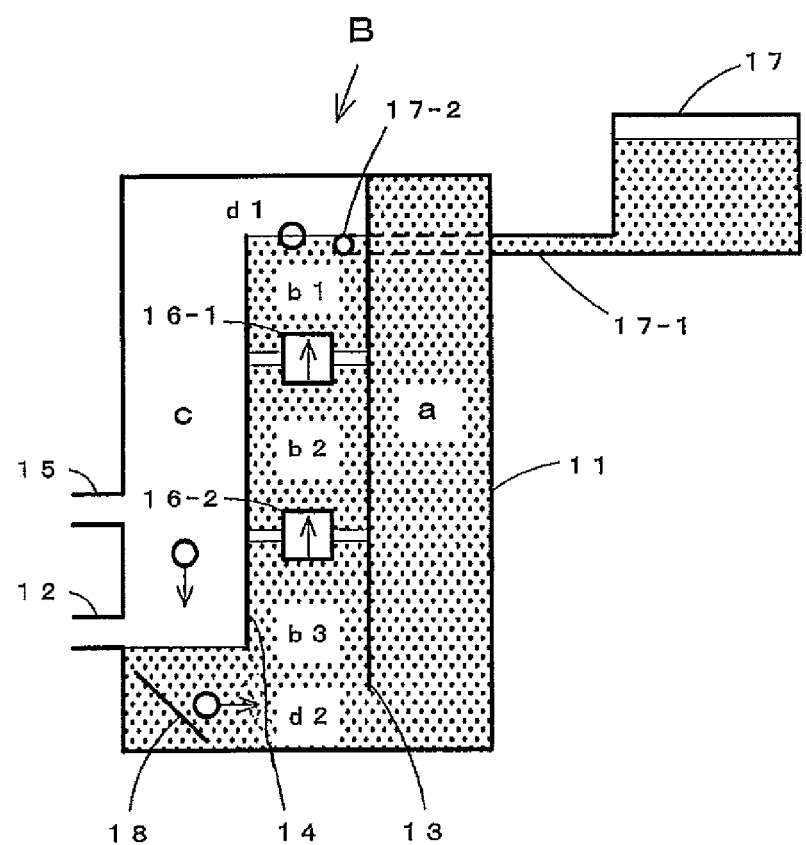
FIG. 5 is a schematic cross-sectional view for illustrating a first embodiment of a sphere circulating apparatus capable of internally forming two water surfaces having different water levels from each other.

The structure of a sphere circulating apparatus B according to the first embodiment shown in FIG. 5 is basically the same as the apparatus in FIG. 4 as shown by the same reference numerals assigned to the same portions, where this sphere circulating apparatus has at least two upward-opening check valves arranged within the rising chamber b as means not communicating the rising chamber b1 with the rising chamber b2 when the upward-opening check valve is opened by the rising sphere. In FIG. 5, an example where two upward-opening check valves are arranged is shown as a typical example.

FIG. 5 shows an example where there are provided two upward-opening check valves 16-1 and 16-2. In this example, the rising chamber b is divided into rising chambers b1, b2 and b3, in which when at least one of the upward-opening check valves is opened, the other upward-opening check valve is automatically closed. It is preferable to further increase the number of the upward-opening check valves depending on the height of the rising chamber.

With this arrangement, even though one of the upward-opening check valves 16-1 and 16-2 is opened by the rising spheres (hereinafter, occasionally represented by singular "sphere" or "each sphere"), the rising chamber b is not entirely and simultaneously communicated, so that the water falling can be prevented and the first water surface at the upper end aperture of the rising chamber b1 can be maintained as formed. For example, when the upward-opening check valve 16-1 is closed and the upward-opening check valve 16-2 is opened as the sphere rises, the water in the rising chamber b1 is held by the upward-opening check valve 16-1 closed and the insides of the rising chambers b2 and b3 are held in the sealed state, so that as with the principle of tap in the automatic waterer A in FIG. 1 the second water surface at the lower end aperture of the falling chamber c is maintained in combination with the sealed state of the water storage chamber a.

While each of a plurality of spheres having fallen dives into and under the second water surface formed at the lower end aperture of the falling chamber c, that is enters into the communication chamber d2 sequentially, a guide plate 18 having an inclination angle of 45 degrees with respect to the horizontal direction is arranged in the communication chamber d2 below the falling chamber c in order to guide the sphere such that it may smoothly proceed to the lower end aperture of the rising chamber b3.

If due to a large motion energy or force of the falling sphere the sphere having been guided to the guide plate 18 may reach up to the lower end aperture of the water storage chamber a, it is preferable to provide a blocking plate at the lower end of the bulkhead plate 13 while not shown in FIG. 5. Since this blocking plate is provided within the communication chamber d2, a devisal such as making a hole in the blocking plate so as not to block the flow of the water is necessary.

While in FIG. 5 a single sphere is typically shown, actually a plurality of spheres are sequentially inserted from the insertion port 15 at intervals. When the sphere having naturally fallen in the falling chamber c has dived into the second water surface formed at the lower end aperture of the falling chamber c, the second water surface is risen by the volume of the sphere and the water of the risen amount will be drained to the outside of the apparatus from the water supply/drain port 12, where after the water has been drained, the water amount drained is to be replaced by the volume of the sphere dived, so that the water level of the second water surface remains the same as before the diving.

As shown in FIG. 5, when the sphere dived is directed to the lower end aperture of the rising chamber b3 by the guide plate 18, the sphere rises within the rising chamber b3 by its buoyancy force. When the rising sphere open the upward-opening check valve 16-2 and enters into the rising chamber b2, the water amount by the volume of the rising sphere shifts from the rising chamber b2 to the rising chamber b3 through the upward-opening check valve 16-2. Then, the upward-opening check valve 16-2 is automatically closed, where the rising chambers b2 and b3 assume the sealed state.

Rising within the rising chamber b2, the sphere now opens the upward-opening check valve 16-1 and enters into the rising chamber b1. Similarly, when the rising sphere enters into the rising chamber b1, the water amount corresponding to the volume of the rising sphere shifts from the rising chamber b1 to the rising chamber b2 through the upward-opening check valve 16-1. Then, the upward-opening check valve 16-1 is automatically closed, where the water within the rising chamber b1 is held.

The water within the rising chamber b1 is held by the upward-opening check valve 16-1 being closed, where the sphere having risen is to float on the first water surface at the upper end aperture of the rising chamber b1. Therefore, the water level of the first water surface is lowered by a portion or volume of the floating sphere appearing in the air. When the sphere gets out of the first water surface, the water amount corresponding to a submerged portion of the sphere is also reduced, thereby lowering the first water surface by the portion. Namely, while the sphere is circulating, the water amount corresponding to the volume of a single sphere is to be reduced at the upper end aperture of the rising chamber b1, resulting in that the water level of the first water surface is lowered.

Thus, the fact that the water level of the first water surface at the upper end aperture of the rising chamber b1 is lowered by the water amount makes it difficult to push up each one sphere by the buoyancy forces of the plurality of spheres having been rising and clear the upper end of the bulkhead plate 14. For this problem, in order to facilitate to shift the sphere toward the upper end aperture of the falling chamber c, this first embodiment comprises an automatic water supply device (waterer) 17 for supplying water to an upper portion of the rising chamber b1 since the first water surface is required to be maintained at the upper end aperture of the rising chamber b1.

It is to be noted that the weight and the volume of the sphere to be fallen are adjusted so that the buoyancy force of the sphere itself may be generated in the water filled in the rising chambers b1, b2 and b3. The sphere may include for example a hollow metal sphere, where it is preferred to have a structure in which a metal ball is contained in a hollow spherical shell formed of a hard or soft synthetic resin so that the metal ball may move freely in the spherical shell. A plurality of the spheres each having such a structure are prepared. The number of the spheres is required to be determined so that at least a buoyancy force enough to push up one sphere from the upper end aperture of the rising chamber b1 by the presence of the plurality of spheres having been rising may be generated.

A water supply port 17-2 of a water supply pipe 17-1 extending from the automatic water supply device 17 is provided at the upper portion of the rising chamber b1 so that the upper end of the water supply port 17-2 may coincide with the horizontal surface of the upper end aperture of the rising chamber b1. The water supply port 17-2 being located at this position, the first water surface at the upper end aperture of the rising chamber b1 is lowered, where air from the water supply port 17-2 comes into the automatic water supply device 17, so that as with the automatic water supply principle of the automatic waterer A shown in FIG. 1, the water is supplied from the automatic water supply device 17 to the rising chamber b1. Consequently, the first water surface is maintained at the level of the upper end aperture of the rising chamber b1, facilitating that one sphere is pushed up by the buoyancy forces of the plurality of spheres having been rising to clear the upper end of the bulkhead plate 14.

It is to be noted that there is a case in the sphere circulating apparatus B shown in FIG. 5 where when the sphere falls in the falling chamber c and dives into the second water surface, the dived sphere involves air bubbles inside the communication chamber d2. In this case, at first the air bubbles involved will necessarily come into the rising chamber b3, then rise in the rising chamber b2 when the upward-opening check valves 16-2 and 16-1 are opened by the rising sphere and finally get into the rising chamber b1. These air bubbles are released to the communication chamber d1, so that by the volume of the air bubbles the water level of the first water surface at the upper end aperture of the rising chamber b1 is lowered, where as a result of the water being supplied from the automatic water supply device 17 to the rising chamber b1, the first water surface is maintained at the level of the upper end aperture of the rising chamber b1.

A circulating operation of the sphere in the sphere circulating apparatus B thus arranged will be described referring to FIG. 5.

At first, in the same way as the apparatus in FIG. 4, when the sphere circulating apparatus B is laid on its side to be filled up with water and then restored, as shown in FIG. 5 the water storage chamber a is being stored with water up to the upper portion, where the water is filled up to the upper end aperture of the rising chamber b1, thereby forming the first water surface at the upper end aperture of the rising chamber b1 and forming the second water surface at the lower end aperture of the falling chamber c. Between the first and the second water surfaces, there is a substantial difference of the height of the bulkhead plate 14.

Therefore, by inserting a plurality of spheres prepared into the falling chamber c from the insertion port 15 and allowing them to naturally fall one after another, each of the falling spheres dives under the second water surface by the motion energies of the spheres. Then, each sphere guided by the guide plate 18 and entered into the communication chamber d2 enters into the lower end aperture of the rising chamber b3 and then rises due to the effect of the buoyancy force.

The sphere rising in the rising chamber b3 open the upward-opening check valve 16-2 and enters into the rising chamber b2. After the sphere has entered into the rising chamber b2, the upward-opening check valve 16-2 is automatically closed. The sphere having been rising opens the next upward-opening check valve 16-1, then enters into the rising chamber b1 and reaches the first water surface at the upper end aperture of the rising chamber b1. At this time, as aforementioned, the water level of the first water surface is lowered, where the water of the automatic water supply device 17 from the water supply port 17-1 is supplied, so that the first water surface is maintained at the position of the upper end aperture of the rising chamber b1.

Thus, the plurality of spheres sequentially reach the first water surface at the upper end aperture of the rising chamber b1, where as a result of the combined buoyancy forces of the plurality of spheres, among the plurality of spheres having reached the first water surface at the upper end aperture of the rising chamber b1, the sphere positioned at an upper level is pushed up, rolled into the upper end aperture of the falling chamber c and naturally fallen in the falling chamber c.

The sphere having fallen in the falling chamber c dives into the second water surface at the lower end aperture of the falling chamber c. And, the dived sphere is guided by the guide plate 18 to the rising chamber b3 and rises toward the first water surface. Thus, the sphere circulates in the apparatus while repeatedly falling and rising.

As above described, according to the sphere circulating apparatus B of the first embodiment, by repeating such an operation that each of the spheres naturally falls from the first water surface higher in water level to the second water surface lower in water level and rises from the second water surface to the first water surface by the buoyancy force, each of the spheres can be circulated in the apparatus without particularly supplying energy for the circulation from the outside, where the motion energy of the falling sphere can be extracted.

It is here assumed that in the sphere circulating apparatus B of the first embodiment, the mounting position of the inserting port 15 has a sufficient height for allowing at least the sphere having dived into the second water surface formed at the lower end aperture of the falling chamber c to enter into and under the second water surface. The insertion port 15 provided in the falling chamber c may be positioned in an upper portion of the falling chamber c while it is arranged in the middle of the falling chamber c in FIG. 5.

Since the falling chamber c of the sphere circulating apparatus B forms a free space communicating with the external air, the motion energy of the sphere can be easily extracted in the falling chamber c. For example, by providing a vertically long slit in a side wall of the falling chamber c, a part of a blade of rotatable impeller can be inserted in the slit, where when the falling sphere strikes the blade part, the motion energy of the sphere can rotate the impeller, so that the motion energy of the sphere can be converted into the rotation energy. For example, this rotation energy can be used for electric power generation.

Also, by increasing the entire height of the sphere circulating apparatus B to increase the height of the falling chamber c, the motion energy of the sphere can be increased. For example, if a plurality of the above impellers can be installed, the electric power generation amount can be increased.

Second Embodiment

While the sphere circulating apparatus B according to the first embodiment as above described is adapted to have a structure in which at least two upward-opening check valves are arranged so that when the upward-opening check valves are opened by the rising sphere, the rising chambers b1 and b2 are not mutually communicated, a sphere circulating apparatus according to this second embodiment is adapted to have a structure in which in order to more surely prevent the water from falling or dropping in the rising chamber when the upward-opening check valves are opened, the communication chamber d1 is interrupted from the atmosphere; to this end, at least two downward-opening check valves are arranged within the falling chamber c.

Figure 6:
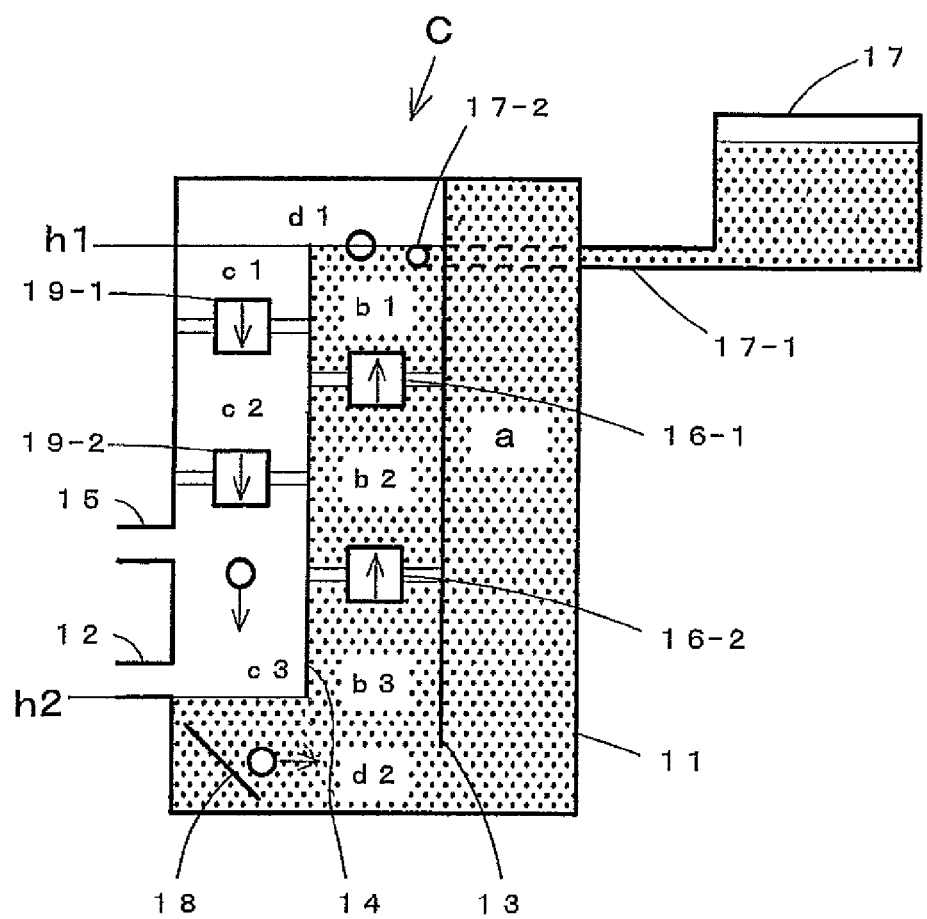
FIG. 6 is a schematic cross-sectional view for illustrating a second embodiment of a sphere circulating apparatus capable of internally forming two water surfaces having different water levels from each other.

A sphere circulating apparatus C according to the second embodiment is shown in FIG. 6. The structure of the sphere circulating apparatus C is basically the same as the sphere circulating apparatus B of the first embodiment shown in FIG. 5, where the same portions are assigned the same reference numerals. The difference of the sphere circulating apparatus C from the sphere circulating apparatus B is that within the falling chamber c, downward-opening check valves 19-1 and 19-2 are provided at intervals, where FIG. 6 shows an example provided with two downward-opening check valves.

The provision of the downward-opening check valves 19-1 and 19-2 within the falling chamber c can serve to block the waters in the rising chambers b1-b3 from falling when the rising sphere opens the upward-opening check valves 16-1 or 16-2 and the rising chambers b1-b3 are all communicated, thereby prevent the water level of the first water surface at the upper end aperture of the rising chamber b1 from being lowered. That is, when either of the downward-opening check valves 19-1 and 19-2 is closed, a negative pressure is maintained within the communication chamber d1, thereby preventing the first water surface h1 from being lowered from the upper end aperture of the rising chamber b1.

In FIG. 6, an example provided with two downward-opening check valves 19-1 and 19-2 is shown. In this example, the falling chamber c is divided into falling chambers c1, c2 and c3, provided that when at least one of the downward-opening check valves is opened, the other downward-opening check valve is automatically closed. The number of the downward-opening check valves can be properly increased.

Also in this sphere circulating apparatus C thus structured as with the sphere circulating apparatus of the first embodiment described above, it is first laid on its side to be filled up with water and then restored, where as shown in FIG. 6, the water storage chamber a is stored with water up to the upper portion, so that the water is filled up to the upper end aperture of the rising chamber b1 to form the first water surface h1 while at the lower end aperture of the falling chamber c the second water surface h2 is formed.

Therefore, a plurality of spheres prepared are sequentially inserted from the insertion port 15 into the falling chamber c3 at intervals and naturally fallen one after another, where the difference of the sphere circulating apparatus C of the second embodiment from the sphere circulating apparatus B of the first embodiment is the addition of the downward-opening check valves 19-1 and 19-2, so that the circulating process of the falling spheres from diving into the second water surface h2 to reaching the first water surface at the upper end aperture of the rising chamber b1 is the same as the case of the sphere circulating apparatus B of the first embodiment aforementioned.

Thus, a plurality of spheres reach the first water surface at the upper end aperture of the rising chamber b1 one after another, where the buoyancy forces by the plurality of spheres push up one of the spheres having reached the first water surface at the upper end aperture of the rising chamber b1, that is the sphere existing at an upper position, to be rolled into the upper end aperture of the falling chamber c1, from which the sphere naturally falls.

The falling sphere in the falling chamber c1 opens the downward-opening check valve 19-1 and enters into the falling chamber c2. As soon as the sphere has fallen into the falling chamber c2, the downward-opening check valve 19-1 is automatically closed. Then, the falling sphere opens the next downward-opening check valve 19-2, then falls within the falling chamber c3, and dives into and under the second water surface at the lower opening of the falling chamber c3. The sphere having thus dived is guided by the guide plate 18 to the rising chamber b3 and rises toward the first water surface.

Thus, in the sphere circulating apparatus C of the second embodiment, either of the downward-opening check valves 19-1 and 19-2 is closed, so that the water in the rising chambers b1-b3 can be prevented from being dropped in combination with the effect of the upward-opening check valves 16-1 and 16-2; in the same way as the case of the sphere circulating apparatus B of the first embodiment, by repeating the naturally falling operation of each of the spheres from the first water surface h1 higher in water level to the second water surface h2 lower in water level and of the rising operation of each of the spheres by the buoyancy force from the second water surface h2 into which the sphere has dived to the first water surface h1, each of the spheres can be circulated within the apparatus only by supplementing the water without supplying specific energy for the circulation from the outside, whereby the motion energy of the falling sphere can be extracted.

It is to be noted that since the sphere circulating apparatus C of the second embodiment is provided with the downward-opening check valves 19-1 and 19-2 in the falling chamber, the insertion port 15 is preferable to be provided at an upper portion of the falling chamber c3. Also, it is assumed that the mounting position of the insertion port 15 is sufficiently high enough for allowing at least the sphere having fallen into the second water surface h2 formed at the lower end aperture of the falling chamber c3 to dive or rush into and under the water surface.

Third Embodiment

The sphere circulating apparatuses according to the first and the second embodiments described above require, for forming the first and the second water surfaces within the apparatus, processes of firstly laying the entire apparatus on its side, of filling the inside of the apparatus up with water and of restoring the apparatus to the original position. Requiring such processes is inconvenient, so that for a large scaled sphere circulating apparatus such processes may be difficult to be adopted.

Figure 7:
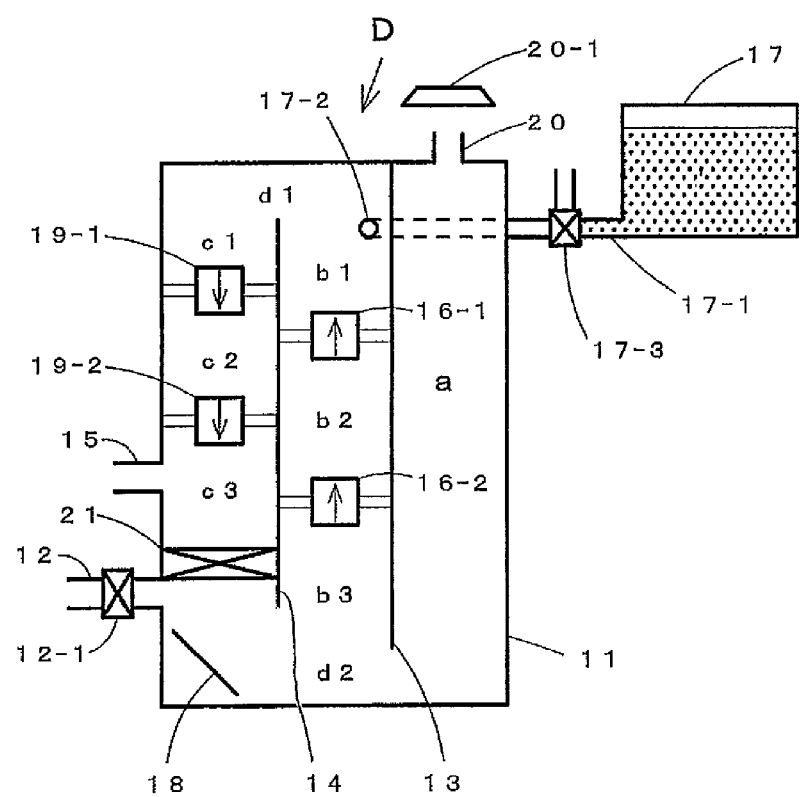
FIG. 7 is a schematic cross-sectional view for illustrating a third embodiment of a sphere circulating apparatus capable of internally forming two water surfaces having different water levels from each other.

For this problem, this third embodiment of the sphere circulating apparatus enabling the first and second water surfaces to be formed within the apparatus with the apparatus being kept in its upright state without adopting the above processes is shown in FIG. 7. A sphere circulating apparatus D of the third embodiment shown in FIG. 7 has basically the same structure as the sphere circulating apparatus C according to the second embodiment shown in FIG. 6, where the same portions are assigned the same reference numerals.

Difference between the sphere circulating apparatus D of the third embodiment and the sphere circulating apparatus C of the second embodiment is that (1) a three-way valve is provided in the course of the water supply pipe of the automatic water supply device and a water supply port is provided at the summit or top of the water storage chamber a with a seal plug being freely detachable, (2) a drain port is substituted for the water supply/drain port and is provided with a drain valve and (3) a gate valve is provided at a lower portion of the falling chamber c3.

(1) As shown in FIG. 7, a three-way valve 17-3 provided in the course of the water supply pipe 17-1 connected to the automatic water supply device 17 is normally operated in the direction of supplying water to the water supply port 17-2 from the automatic water supply device 17, while upon supplying the water to the water storage chamber a, it is operated in the direction of connecting the water supply port 17-2 to the external atmosphere. Also, a seal plug 20-1 is normally attached to the water supply port 20 to seal the water storage chamber a, where upon supplying water to the water storage chamber a, it is detached from the water supply port 20 for enabling the water to be supplied to the water storage chamber a.

It is to be noted that while the sphere circulating apparatus D shown in FIG. 7 is provided with the three-way valve 17-3 on the way to the water supply pipe 17-1, this is not restrictive, i.e. if the valves of the downward-opening check valves 19-1 and 19-2 are slightly opened when the air pressures of the communication chamber d1 and the falling chamber c1 rise as the water level in the rising chambers b1-b3 during the water supply rises, the three-way valve may be replaced by a shutoff valve which is normally operated in the direction of supplying water to the water supply port 17-2 from the automatic water supply device 17 and is operated upon supplying the water to the water storage chamber a in the direction of shutting off the water supply from the automatic water supply device 17. Additionally, if the water supply pipe 17-1 is a flexible pipe, it may be freely detachable with a clip.

(2) A drain valve 12-1 mounted on the drain port 12 provided in a side wall lower portion of the container body 11 is normally operated to have the open state where the water is drained from the inside of the apparatus to the outside, and is operated to have the closed state where water is supplied to the water storage chamber a.

(3) A gate valve 21 provided at a lower portion of the falling chamber c3 is normally operated to have the released state so that the falling sphere may pass therethrough, and is operated upon supplying the water to the water storage chamber a to have the closed state where the lower portion of the falling chamber c is closed.

Figure 8:
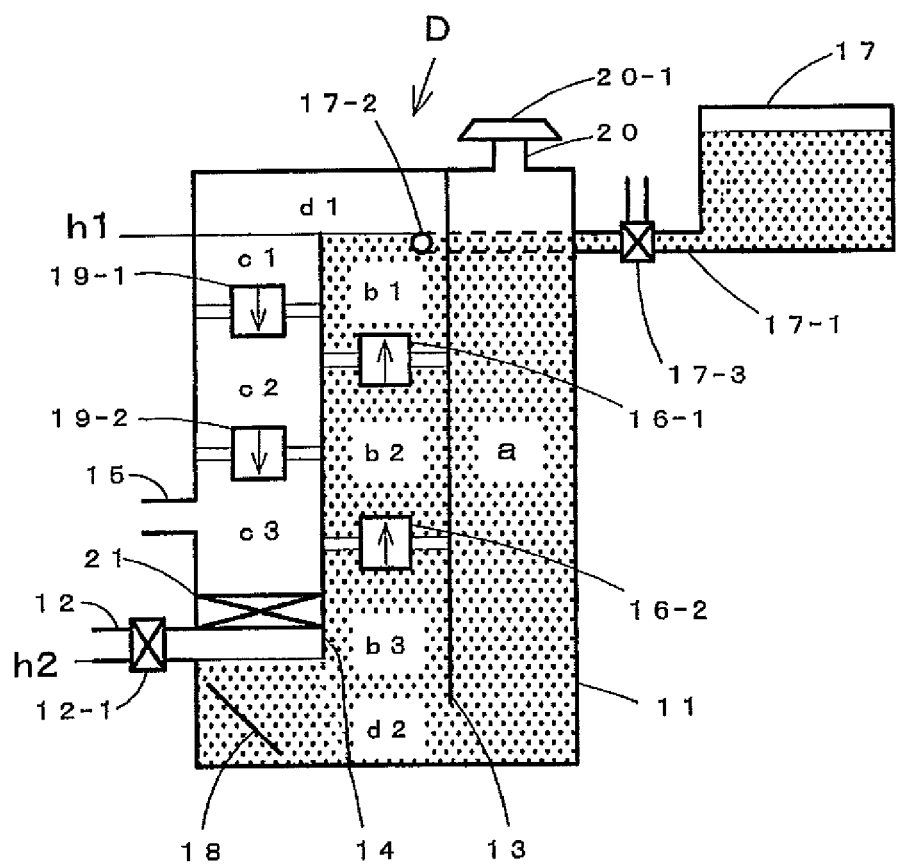
FIG. 8 is a schematic cross-sectional view for illustrating an aspect how a sphere is circulated via repeated falls and rises in the sphere circulating apparatus according to the third embodiment.

FIG. 7 shows a state for supplying water within the sphere circulating apparatus D according to the third embodiment, in which a procedure forming the first and the second water surfaces within the apparatus will be described referring to the figures, where FIG. 8 shows a state after the first and the second water surfaces have been formed within the sphere circulating apparatus D shown in FIG. 7.

It is now assumed that as shown in FIG. 7 there is originally no water inside the sphere circulating apparatus D. At first, the seal plug 20-1 on the top of the water storage chamber a is detached and the three-way valve 17-3 is operated in the direction of connecting the water supply port 17-2 to the external atmosphere so that no water may be supplied from the automatic water supply device 17 to the water supply port 17-2. Also, the drain valve 12-1 is closed so as not to drain the water, and the gate valve 21 is operated to have the closed state, where the lower portion of the falling chamber c is closed.

Then, water is poured from the top of the water storage chamber a. The water poured is at first stored in the communication chamber d2. As the water level in the communication chamber d2 rises and reaches the lower end of the bulkhead plate 14, the water level will not rise above the lower end of the bulkhead plate 14 in the presence of a sealed space in the lower portion of the falling chamber c, where at the lower portion of the falling chamber c the second water surface h2 is formed.

As the water supply from the top of the water storage chamber a further continues, the water level in the water storage chamber a and the water levels in the rising chambers b1-b3 rise at the same speed with the second water surface h2 being held at the lower portion of the falling chamber c3. At this time, the air in the rising chambers b1-b3 is released from the three-way valve 17-3 to the outside.

When the water level reaches the upper end aperture of the rising chamber b1, the water supply from the top of the water storage chamber a is stopped and the upper portion of the water storage chamber a is sealed by attaching the seal plug 20-1 to the water supply port 20, where the three-way valve 17-3 is operated in the direction of supplying the water to the water supply port 17-2 from the automatic water supply device 17, whereby at the upper end aperture of the rising chamber b1 the first water surface h1 is formed.

It is to be noted that according to the sphere circulating apparatus D, as shown in FIG. 8, the water level of the water storage chamber a can not be made higher than the first water surface h1 formed so that the air remains stored at the upper portion of the water storage chamber a, where the space having stored the air gives no contribution to the water storage in the water storage chamber a and so is needless. Therefore, the height of the top of the water storage chamber a does not necessarily need the position of the communication chamber d1 as shown and rather may be a height in conformity to at least the water level of the first water surface h1.

Finally, the drain valve 12-1 and the gate valve 21 are both opened. Being sequentially inserted from the insertion port 15, has with the case of the sphere circulating apparatus C of the second embodiment described above, a plurality of spheres circulate in the sphere circulating apparatus D with the repetition of natural falls and rises one after another, enabling the falling motion energies of the spheres to be extracted from the falling chamber c3.

(Specific Examples of Sphere Circulating Apparatus)

Thus, the First-Third Embodiments of the Sphere Circulating Apparatus according to the present invention have been described. Next, specific examples of the sphere circulating apparatus D of the third embodiment will be described referring to FIGS. 9-20.

While in the sphere circulating apparatus D shown in FIG. 7, the bulkhead plates 13 and 14 are arranged inside the container body 11 to form the water storage chamber a, the rising chambers b1-b3, the falling chambers c1-c3 and the communication chambers d1 and d2, a sphere circulating apparatus E according to specific examples the water storage chamber is structured to replace the rising chamber, the falling chamber and the communication chamber respectively by a water storage pipe, a rising pipe, a falling pipe and a communication pipe. It is to be noted that the communication chamber d2 is made of a water storage box or case. Thus using the pipes for the chambers, the container body can be structured by using commercially available pipe materials without particular manufacturing, can be easily adjusted for the height and can be manufactured inexpensively and readily.

Figure 9:
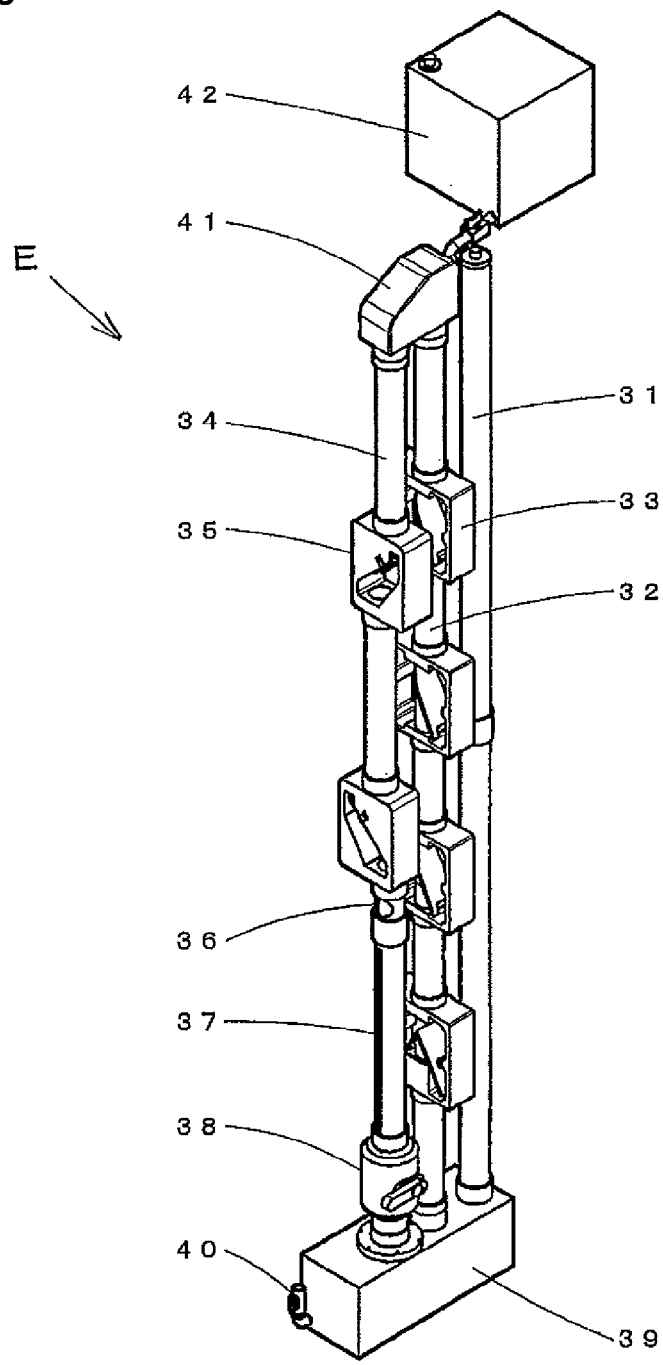
FIG. 9 is a bird's-eye view of a specific example of the sphere circulating apparatus according to the third embodiment.

A bird's-eye view of the sphere circulating apparatus E according to specific examples is shown in FIG. 9.

A water storage pipe 31 in the sphere circulating apparatus E is a resin pipe having an outer diameter of 5.5 cm, an inner diameter of 4.5 cm and a length of 200 cm, being mounted upright on a water storage box 39 serving as the communication chamber d2 in the sphere circulating apparatus D, in which a lower end aperture of the resin pipe 31 is fitted to an aperture portion of an upper plate of the water storage box 39 thereby to communicate the water storage pipe 31 with the water storage box 39.

A rising pipe 32 made of resin having an outer diameter of 5.5 cm and an inner diameter of 4.5 cm has a plurality of upward-opening check valve cases 33 arranged at intervals. A specific example of FIG. 9 shows an example of four upward-opening check valve cases 33. A falling pipe 34 made of resin having an outer diameter of 5.5 cm and an inner diameter of 4.5 cm has a plurality of downward-opening check valve cases 35 arranged at intervals, in which the specific example of FIG. 9 uses two downward-opening check valve cases 33.

It is to be noted that each of a plurality of spheres inserted into the sphere circulating apparatus E is adjusted to have such a size that it may freely pass through the resin pipe having the inner diameter 4.5 cm, where a hollow sphere shell having an outer diameter of 4.2 cm formed of a hard synthetic resin is employed. The weight of the sphere in which an iron ball having a diameter allowing a free movement within the sphere shell is included is assumed to be 23 g.

The rising pipe 32 and the falling pipe 34 are mounted upright on the water storage box 39 in which each lower end aperture of the rising pipe 32 and the falling pipe 34 is fitted to an upper aperture portion of the water storage box 39 to communicate with the water storage box 39 respectively.

Each upper end aperture at the upper portion of the rising pipe 32 and the falling pipe 34 is communicated with each other by a communication chamber formed within a pipe top member 41 while not shown in FIG. 9. At the upper portion of the rising pipe 32 communicated with the communication chamber within the pipe top member 41, there is provided a water supply port of a water supply pipe extending from the automatic water supply device 42.

On the lower side of the falling pipe 34 an insertion port 36 for inserting a plurality of spheres into the pipe is provided, and on the further lower side a slit 37 for inserting an impeller blade for extracting the rotation energy is provided along the shaft. In a further lower portion of the falling pipe 34 a gate valve 38 is provided. While not shown in FIG. 9, the water storage box 39 is provided with a drain device having a drain valve 40.

Figure 10:
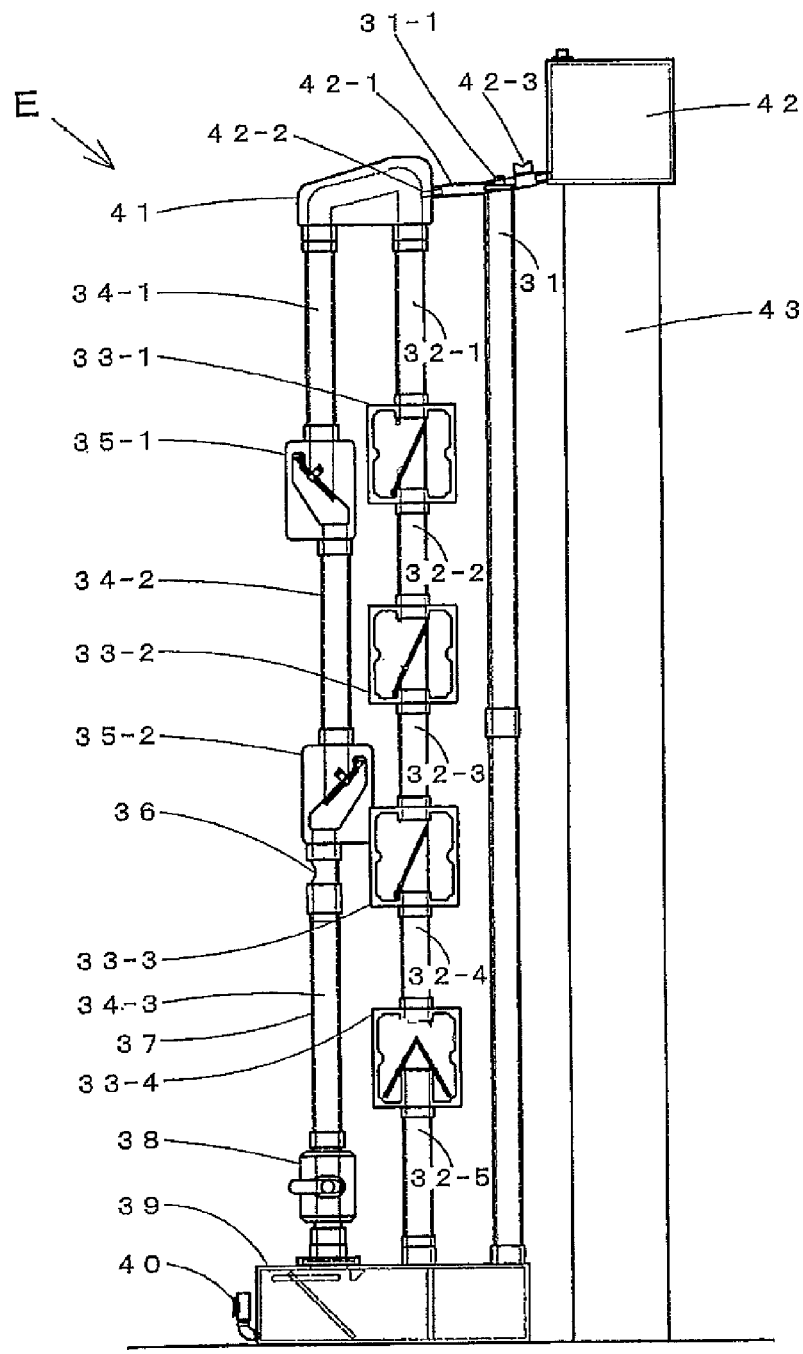
FIG. 10 is a side elevational view of the sphere circulating apparatus according to the specific example.

Thus, referring to FIG. 9 the entire outline of the sphere circulating apparatus E has been described. Next, a specific arrangement example of the sphere circulating apparatus E will be described referring to a side elevational view of the apparatus shown in FIG. 10. In FIG. 10, for facilitating the illustration, the upward-opening check valve cases and the downward-opening check valve cases are shown in a state where the upward-opening check valve case 33 and the downward-opening check valve case 35 shown in FIG. 9 are horizontally rotated by 90 degrees. Therefore, FIG. 10 shows a state where intervals between the water storage pipe, the rising pipe and the falling pipe are enlarged, the lateral width of the water storage box 39 is elongated and intervals between the lower end apertures of the pipes are enlarged.

On the upper end of the water storage pipe 31 a seal plug 31-1 detachable upon the water supply is provided, where the upper end is made matched with the position of the upper end aperture of the rising pipe 32. The rising pipe 32 has four upward-opening check valve cases 33-1, 33-2, 33-3 and 33-4 arranged therein at proper intervals, to which five rising pipes 32-1, 32-2, 32-3, 32-4 and 32-5 are connected respectively. An upper end aperture of the rising pipe 32-1 is, as shown in FIG. 10, interconnected to the communication chamber formed inside the pipe top member 41, where at the upper end aperture the first water surface is formed.

While FIG. 10 shows an example of the upward-opening check valve cases 33-1, 33-2, and 33-3 of a single valve type and an example of the upward-opening check valve case 33-4 of a double valve type, there is no need to mixture the single valve type and the double valve type or only the upward-opening check valve cases of one type may be used. Also while this specific example shows four cases, they may be increased more.

The falling pipe 34 has two downward-opening check valve cases 35-1 and 35-2 arranged therein at proper intervals to which three falling pipes 34-1, 34-2 and 34-3 are connected respectively. The upper end aperture of the falling pipe is connected to the interconnecting pipe 41 to form a natural fall port for the sphere. At a lower portion of the falling pipe 34-3 which is slightly above the lower end aperture of the case 40, a gate valve 38 is provided. While in this example two downward-opening check valve cases are arranged, they may be increased more.

It is to be noted that to each of the four upward-opening check valve cases 33-1, 33-2, 33-3 and 33-4 and the two downward-opening check valve cases 35-1 and 35-2, two transparent cap plates are screwed on both sides thereof through a packing to seal each check valve case.

The automatic water supply device 42 is mounted on the top of a supporting post 43, and a water supply port 42-2 of a water supply pipe 42-1 extending from the device 42 is provided in the pipe wall at an upper portion of the rising pipe 32-1. The automatic water supply device 42 is provided with a seal plug detachable upon supplying water to the apparatus itself, on which a three-way valve 42-3 is mounted.

Figure 11:
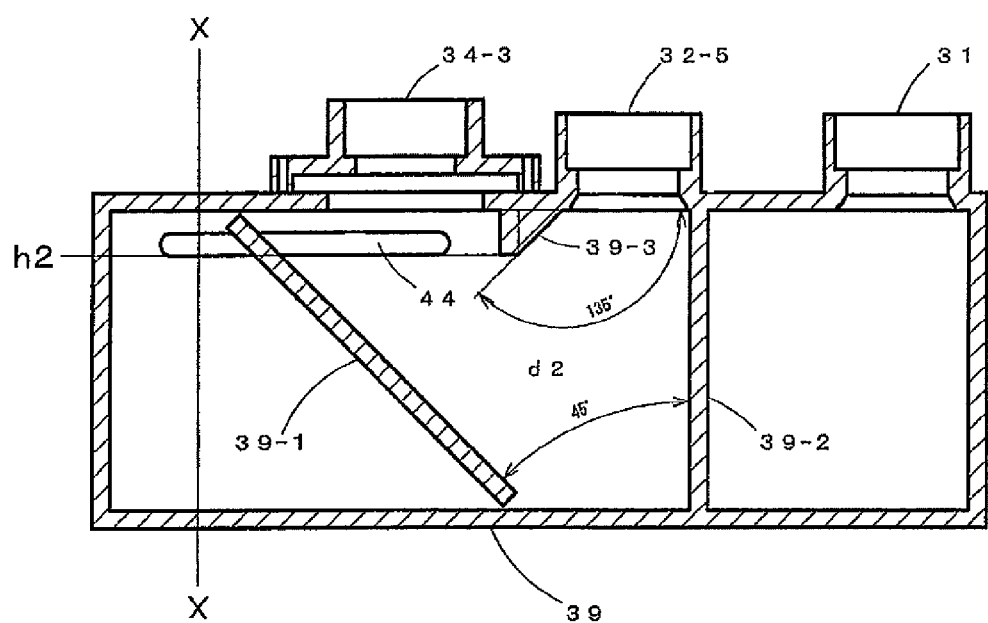
FIG. 11 is a longitudinal-sectional view for illustrating a water storage box or case in the sphere circulating apparatus according to the specific example.

Details of the water storage box 39 in the sphere circulating apparatus E according to the specific example will be described referring to FIG. 11, showing a vertical cross-sectional view of the water storage box 39, in which the upper portions of the water storage pipe 31, the rising pipe 32-5 and the falling pipe 34-3 are omitted with only their lower portions being shown.

The upper side plate of the water storage box 39 is provided with apertures respectively for lower end apertures in the lower portions of the water storage pipe 31, the rising pipe 32-5 and the falling pipe 34-3. The communication chamber d2 within the water storage box 39 has a portion below the aperture for the falling pipe 34-3, in which a guide plate 39-1 is arranged inclined by approximately 45 degrees with respect to the horizon.

Also, between the apertures for the lower end aperture of the water storage pipe 31 and the lower end aperture of the rising pipe 32-5, a blocking plate 39-2 is arranged. This blocking plate 39-2 is fixed to the water storage box 39, in which both sides of the plate are spaced from the side walls of the water storage box 39 so as not to lose the function of the communication chamber d2 in the specific example of FIG. 11. If the overall circumference of the side end of the plate is adhered to the walls of the water storage box 39, the blocking plate itself may be bored or the like.

Between the aperture for the rising pipe 32-5 and the aperture for the falling pipe 34-3, a guide piece 39-3 having a predetermined thickness is fixed to the top plate of the water storage box 39. In the side wall of the water storage box 39, a drain port 44 connecting to the drain device is provided, where the lower end of the guide piece 39-3 is preferred to coincide with the lower side aperture edge of the drain port 44. When the water is supplied to the apparatus, the second water surface is formed where the lower end of the guide piece 39-3 and the lower side aperture edge of the drain port 44 are at the water level h2.

Since the second water surface in the water storage box 39 is not formed in the aperture for the falling pipe 34-3 but is formed at a position lowered by the thickness of the guide piece 39-3 from the surface of the lower end aperture, it assumes an area wider than the area of the aperture for the falling pipe 34-3. This allows the sphere having been falling in the falling pipe 34-3 to easily dive into the second water surface. Also, as shown in FIG. 11, the guide piece 39-3 prescribes the water level of the second water surface in the water storage box 39 and has an inclined plane of approximately 135 degrees with respect to the top plate of the water storage box 39, serving to guide the sphere having dived thereinto to the aperture for the rising pipe 32-5.

Figure 12:
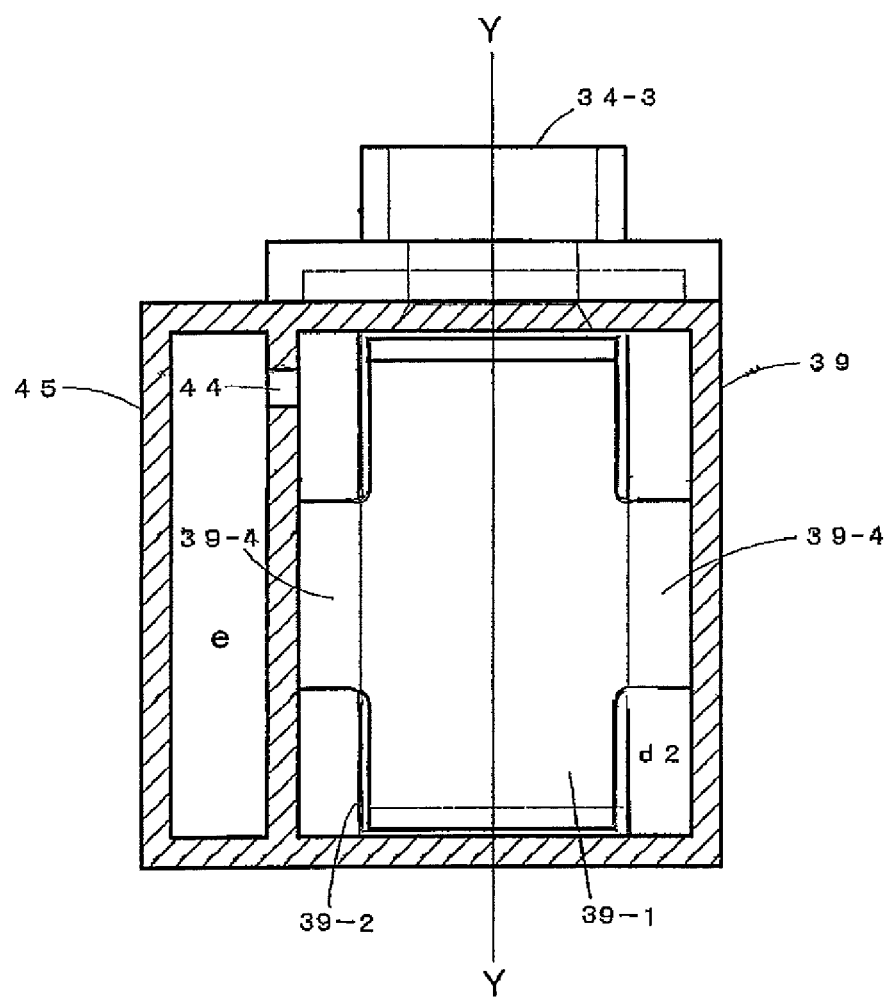
FIG. 12 is a longitudinal-sectional view taken along X-X in the water storage box shown in FIG. 11.

FIG. 12 shows a vertical cross-sectional view of the water storage box 39 taken along line X-X shown in FIG. 11, where FIG. 11 shows a vertical cross-sectional view taken along line Y-Y of the water storage box 39 shown in FIG. 12 and the same reference numerals indicate the same portions between both figures.

As shown in FIG. 12, a drain box 45 is provided within the side wall of the water storage box 39 and within the drain box 45 a drain reservoir chamber e is formed. This drain reservoir chamber e is communicated with the communication chamber d2 in the water storage box 39 through the drain port 44 to store the water overflowed from the communication chamber d2. The drain box 45 is also provided with the drain valve 40 as shown in FIG. 10, so that the switching operation of the drain valve 40 enables the water stored in the drain reservoir chamber e to be drained to the outside of the apparatus.

It is to be noted that FIG. 12 shows a state where in the communication chamber d2 of the water storage box 39 the guide plate 39-1 is fixed to the side wall of the water storage box 39 through a joint piece 39-4 formed on both sides thereof and a state where the blocking plate 39-2 is fixed between the top plate and the bottom plate of the water storage box 39 and is spaced from the side walls of the water storage box 39 so that the water may flow on both sides of the blocking plate 39-2.

Figure 13:
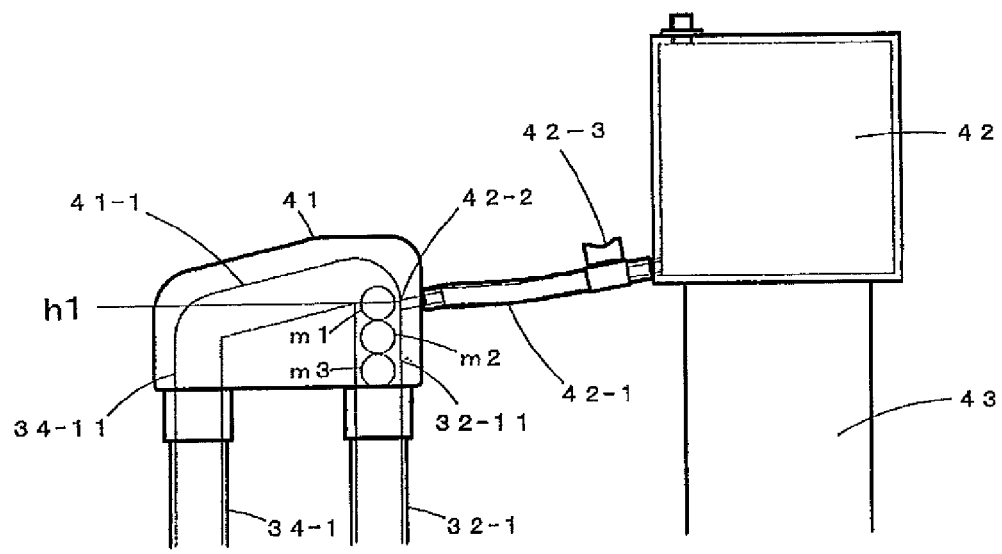
FIG. 13 is a partial side elevational view for illustrating an upper structure of the sphere circulating apparatus according to the specific example.

FIG. 13 shows a zoomed upper portion structure of the sphere circulating apparatus E shown in FIG. 10, in which the same reference numerals are assigned for the same portions in the apparatus E in FIG. 10, where in FIG. 13 the indication of the water storage pipe 31 is omitted. Within the pipe top member 41, a tubal communication chamber 41-1 having the same inner diameter as the rising pipe and the falling pipe is formed.

As shown, one end of the communication chamber 41-1 is connected to an upper end aperture at an upper portion 32-11 of the rising pipe 32-1 and the other end thereof is connected to an upper end aperture of an upper portion 34-11 of the falling pipe 34-1. The communication chamber 41-1 is inclined to facilitate the sphere's roll down toward the falling pipe from the upper end aperture in the upper portion 32-11 of the rising pipe.

The upper portion 32-11 of the rising pipe extends to a position indicated as the water level h1 and at this position is connected to the communication chamber 41-1 to form the upper end aperture. The water supply pipe 42-1 extending from the automatic water supply device 42 is mounted on the side wall of the upper portion 32-11 of the rising pipe 32-1 for the aperture upper edge of the water supply port to match the water level h1. It is to be noted that the three-way valve 42-3 provided in the water supply pipe 42-1 can be switched by operation so as to shut down the water supply to the water supply port to communicate with the atmosphere, or to shut down the communication with the atmosphere to supply the water to the water supply port.

FIG. 13 shows a state where the three-way valve 42-3 is operated to supply the water to the water supply port so that the first water surface at the water level h1 is formed at the upper end aperture of the upper portion 32-11 in the rising pipe 32-1. FIG. 13 shows a process of circulating each of a plurality of spheres, particularly a state where the spheres have risen and reached the upper portion 32-11 of the rising pipe 32-1; how the spheres having risen along the rising pipe shift to the falling pipe and naturally fall will be described.

It is now supposed that as shown in FIG. 13 three spheres m1, m2 and m3 shown by dotted lines have reached the upper portion 32-11 of the rising pipe 32-1. With the aforementioned sphere used, the volume of the sphere is 38.8 cm$^3$ and the weight of the sphere is 23 g, so that the buoyancy force effecting one sphere is 15.8 g, assuming the specific weight of water is 1.

Therefore, in order to push up one sphere above the upper end aperture of the upper portion 32-11 of the rising pipe 32-1, the same two or more spheres are required. Assuming the state shown in FIG. 13, the sphere m1 is pushed up by the buoyancy force of the spheres m2 and m3 above the upper end aperture of the water level h1, rolls into the communication chamber 41-1, proceeds to the upper end aperture of the falling pipe 34-1 and then naturally falls. It is to be noted that in order to surely push up one sphere to allow it to smoothly and naturally fall even though the water level of the first water surfaces is lowered, it is preferable to push up one sphere with three or more spheres.

When one sphere is thus pushed up above the upper end aperture of the upper portion 32-11 of the rising pipe 32-1, the water level of the first water surface is lowered by the volume of the one sphere. Every time each of the spheres proceeds to the communication pipe 41-1, the water level of the first water surface is lowered by the volume of the sphere, so that eventually the sphere would not be pushed up from the upper end aperture of the rising pipe 32-1, thereby stopping the circulation of the spheres.

In this view, when the water level of the first water surface is lowered, the water supply is automatically made to the upper portion 32-11 of the rising pipe 32-1 through the water supply pipe 42-1 from the automatic water supply device 42 to maintain the first water surface at the upper end aperture, so that the sphere can be pushed up from the upper end aperture of the rising pipe 32-1. While the first water surface is maintained at the upper end aperture, the water supply is automatically stopped.

The upper portion structure in the specific example of the sphere circulating apparatus E having been described so far uses the pipe top member 41 integrally formed of the upper portion 32-11 of the rising pipe 32-1, the communication chamber 41-1 and the upper portion 34-11 of the falling pipe 34-1. It is not restricted to the pipe top member integrally formed of them, so that a structure in which the communication chamber 41-1 is formed of an interconnection pipe, to one end of which the upper portion pipe extending from the rising pipe 32-1 is connected and to the other end of which the upper portion pipe extending from the falling pipe 34-1 is connected, may be adopted.

(Specific Examples of Upward-Opening Check Valve Case and Downward-Opening Check Valve Case)

Specific structural examples of the upward-opening check valve case 33 and the downward-opening check valve case 35 used in the sphere circulating apparatus E shown in FIG. 9 will be described referring to FIGS. 14-19, where (1) FIGS.

Figure 14:
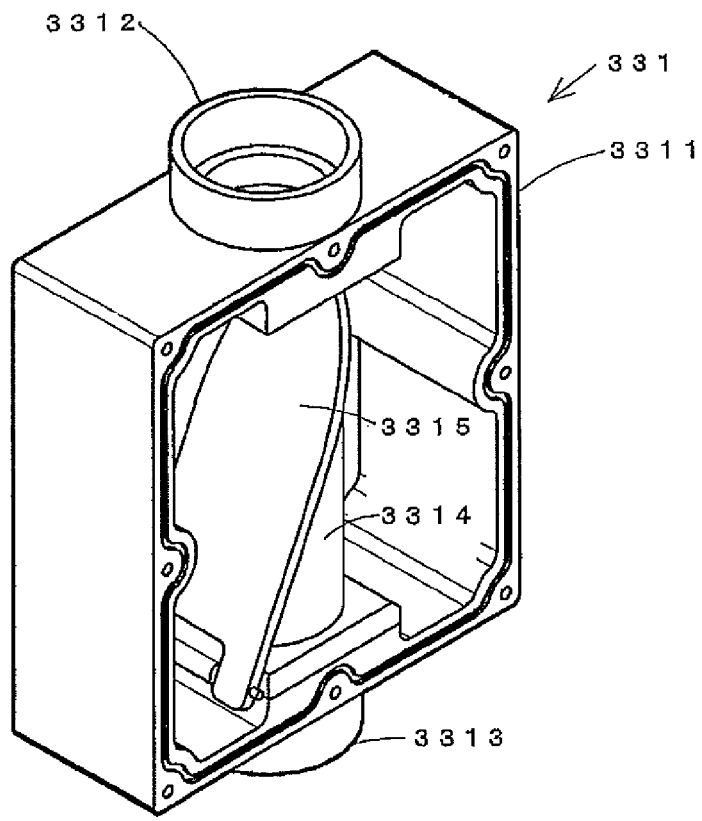
FIG. 14 is a perspective view for illustrating an example 1 of an upward-opening check valve case attached to a rising chamber in the sphere circulating apparatus according to the specific example.
Figure 15:
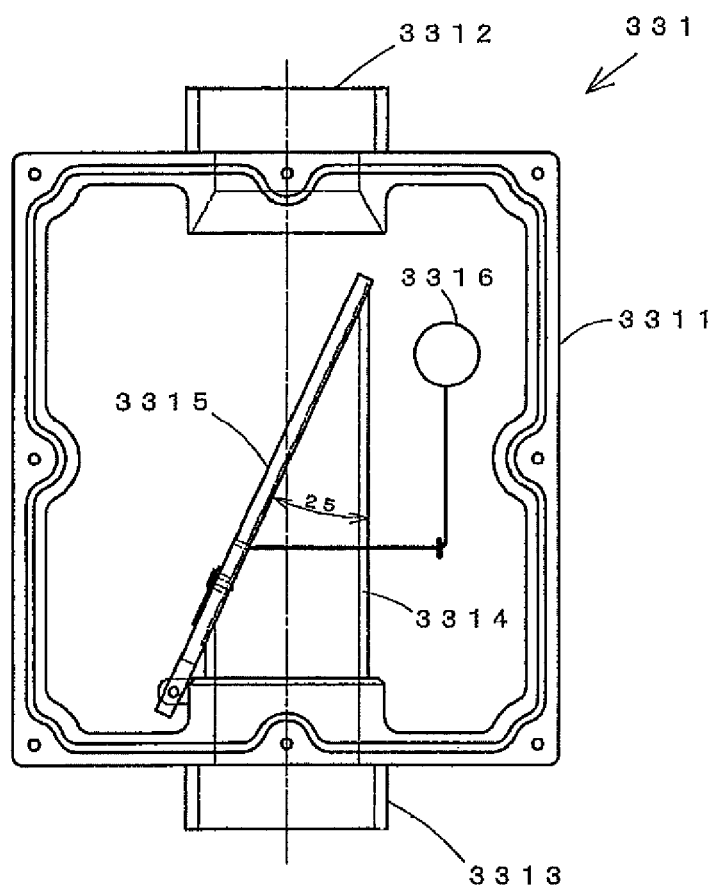
FIG. 15 is a side elevational view for illustrating the upward-opening check valve case of the example 1 shown in FIG. 14.
Figure 16:
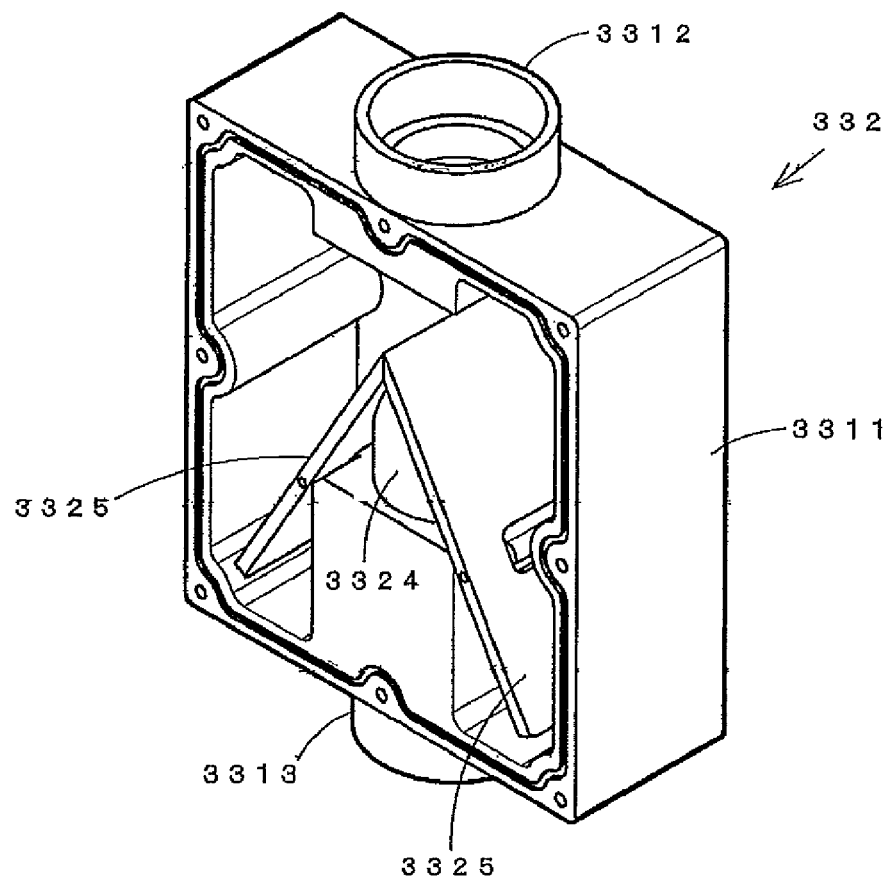
FIG. 16 is a perspective view for illustrating an example 2 of the upward-opening check valve case attached to the rising chamber in the sphere circulating apparatus according to the specific example.
Figure 17:
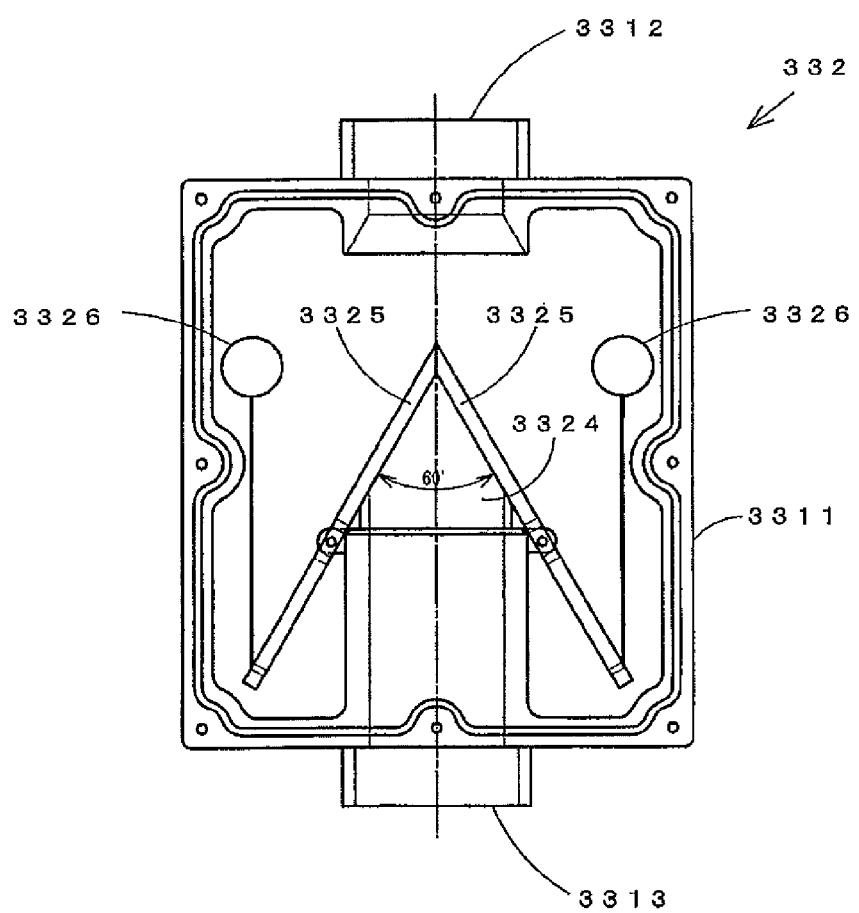
FIG. 17 is a side elevational view for illustrating the upward-opening check valve case of the example 2 shown in FIG. 16.
Figure 18:
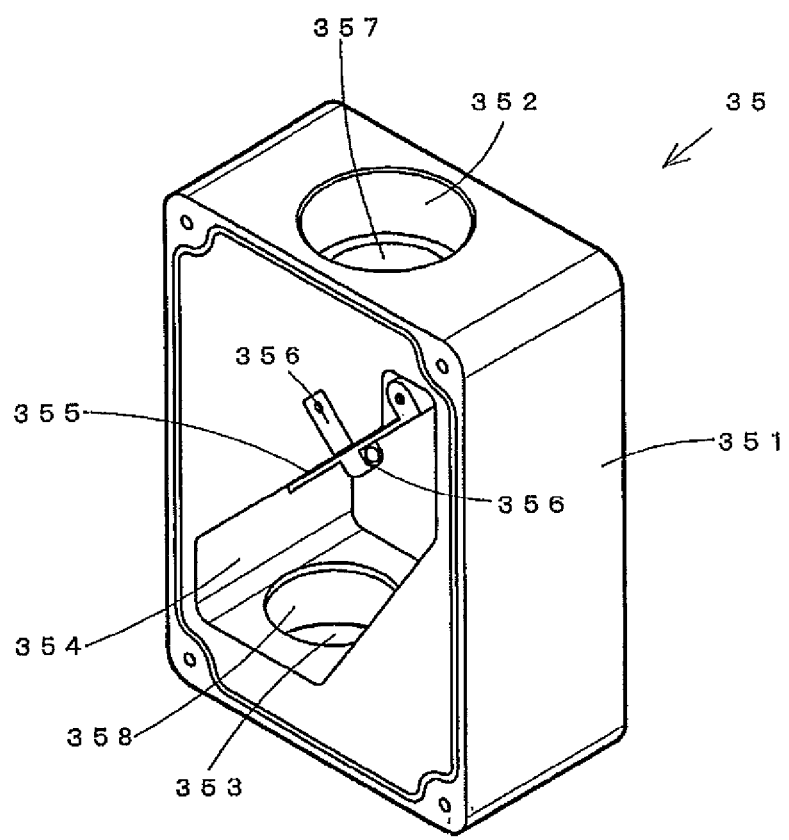
FIG. 18 is a perspective view for illustrating a downward-opening check valve case attached to a falling chamber in the sphere circulating apparatus according to the specific example.
Figure 19:
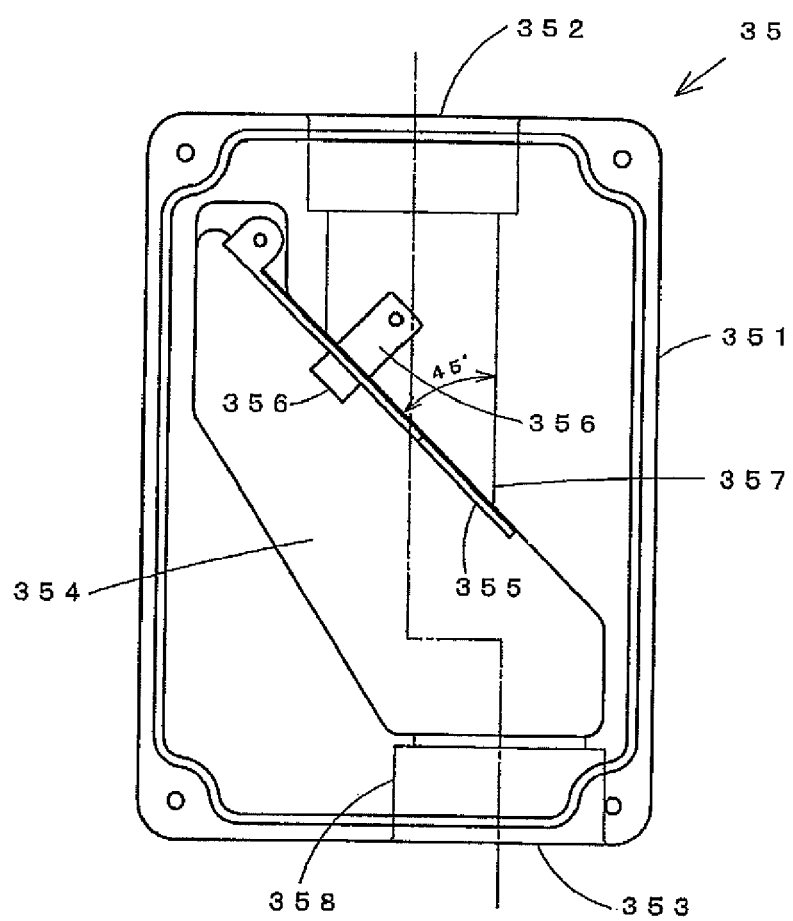
FIG. 19 is a side elevational view for illustrating the downward-opening check valve case shown in FIG. 18.

14 and 15 show a specific example of the upward-opening check valve case of a single valve type, (2) FIGS. 16 and 17 show a specific example of the upward-opening check valve case of a double valve type, and (3) FIGS. 18 and 19 show a specific example of the downward-opening check valve case. (1) FIG. 14 is a perspective view of an upward-opening check valve case 331 and FIG. 15 is a side elevational view of the upward-opening check valve case 331, where the same portions are assigned the same reference numerals. It is to be noted that the upward-opening check valve case is shown as being detached from the apparatus and the cover plates on both sides are detached to see the inside of the upward-opening check valve case. When incorporated into the sphere circulating apparatus, the cover plates on both sides are screwed through a packing, so that the inside is sealed to prevent the water from being leaked even though the water pressure inside the upward-opening check valve case becomes high. It is to be noted that the cover plates are not shown.

The upward-opening check valve case 331 has a frame shaped-valve case 3311 integrally formed of for example a synthetic resin. On the upper side of the valve case 3311 a pipe coupler 3312 to be coupled with the lower end portion of the rising pipe is provided so that the inside of the valve case 3311 and the lower end aperture of the rising pipe are communicated with each other. The lower end of the pipe coupler 3312 extends to the inside of the valve case 3311. The lower side of the valve case 3311 is provided with a pipe coupler 3313 to be coupled with the upper portion of the rising pipe, so that the inside of the valve case 3311 and the upper end aperture of the rising pipe are communicated with each other. On the upper end of the pipe coupler 3313 a rising guide pipe 3314 extending to the inside of the valve case 3311 is mounted.

The upper portion of the rising guide pipe 3314 has a shape as obliquely cut and has a plane forming approximately 25 degrees with respect to the verticality. When a valve body 3315 contacts with the oblique plane formed in the upper portion of the rising guide pipe 3314, the rising guide pipe 3314 can be closed. When a water pressure is supplied inside the valve case 3311 from the pipe coupler 3312, the valve body 3315 is pressed against the plane of the upper portion of the rising guide pipe 3314 as shown, thereby shutting down the water flow from the valve case 3311 to the pipe coupler 3313.

The lower portion of the valve body 3315 is journaled on the base portion of the rising guide pipe 3314 and rotates to allow the upper portion of the rising guide pipe 3314 to freely open and close. In the middle of one side of the valve body 3315 one end of a filament such as a bind or string is fixed, the other end of the filament being attached to a floating body 3316. Moreover, a hook member passing the filament therethrough is provided on the cover body not shown in FIG. 15 to allow the floating body 3316 to be apart from the valve body 3315.

It is to be noted that the upward-opening check valve case shown in FIGS. 14 and 15 illustrates a state where the cover plates are detached for the convenience sake so that in the state shown, the water is not filled up. For facilitating the description, the position of the floating body 3316 shown in FIG. 15 is indicated assuming a state where the upward-opening check valve case 331 is incorporated into the sphere circulating apparatus and the floating body is floating with the water being filled up.

After the upward-opening check valve case 331 is incorporated into the sphere circulating apparatus, the buoyancy force of the floating body 3316 is adjusted such that the valve body 3315 may be pushed up by the buoyancy of the sphere having risen and reached within the rising guide pipe 3314 and the valve body 3315 may be quickly closed after the sphere has passed. The mounting position of the filament attached to the floating body 3316 on the valve body 3315 can also be adjusted together with the buoyancy force of the floating body 3316. After the upward-opening check valve case 331 is incorporated into the sphere circulating apparatus and while the sphere is circulating within the apparatus, the valve body 3315 of the upward-opening check valve case 331 is closed except the time when the sphere is passing therethrough.

(2) While a specific example of the upward-opening check valve case of a single valve type has been thus described, a specific example of the upward-opening check valve case of a double valve type will now be described referring to FIGS. 16 and 17, where FIG. 16 is a perspective view of the upward-opening check valve case 332 and FIG. 7 is a side elevational view of the upward-opening check valve case 332 with the same portions being assigned the same reference numerals.

FIGS. 16 and 17 also show a state where the upward-opening check valve case shown is detached from the apparatus as with the case of FIGS. 14 and 15 and further the cover plates on both sides are also detached to see the inside of the upward-opening check valve case. After the case has been incorporated into the sphere circulating apparatus, the cover plates on both sides are screwed to the valve case through a packing to seal the inside so that the water may not be leaked even though the water pressure inside the upward-opening check valve case becomes high, where the cover plates are not shown here either.

The upward-opening check valve case 332 has basically the same structure as that of the upward-opening check valve case shown in FIGS. 14 and 15, where the same portions are assigned the same reference numerals, and the difference resides in that while the upward-opening check valve case 331 uses a single valve body, the upward-opening check valve case 332 uses two valve bodies 3325.

Since the upper portion of the rising guide pipe 3324 is cut like a mountain shape so that two valve bodies 3325 may form approximately 60 degrees between them, when each of the two valve bodies 3325 contact with the oblique plane of the mountain shape formed at the upper portion, the rising guide pipe 3324 can be closed. At this time, the summit portions provided by the two valve bodies 3325 are also sealed. When a water pressure is applied within the valve case 3311 from the pipe coupler 3312, the two valve bodies 3325 are pressed against the planes of the upper portion of the rising guide pipe 3324 as shown, thereby shutting off the water flow from the valve case 3311 to the pipe coupler 3313.

A middle portion of each of the valve bodies 3325 is journaled on the base portion of the rising guide pipe 3324, thereby rotating so as to freely open/close the above portion of the rising guide pipe 3324. To the opposite side to the summit portion of each of the valve bodies 3325 one end of a filament such as a bind or string is fixed while to the other end the floating body 3326 is attached.

Also, the upward-opening check valve case 332 in FIGS. 16 and 17, like the upward-opening check valve case 331 shown in FIGS. 14 and 15, represents the state of the cover plates being detached for the convenience of description, where the water is not yet filled up. On the other hand, for facilitating the description, the position of each of the two floating bodies 3326 shown in FIG. 17 is shown assuming a state where the upward-opening check valve case 331 is incorporated into the sphere circulating apparatus and the floating body is floating with the water being filled up.

After the upward-opening check valve case 332 is incorporated into the sphere circulating apparatus, each buoyancy force of the floating bodies 3326 is adjusted such the two valve bodies 3325 may be both pushed up by the buoyancy force of the sphere having risen in the rising guide pipe 3314 and the two valve bodies 3325 may be quickly closed after the sphere has passed. Also the mounting position of the filament attached to each of the floating bodies 3326 on the valve bodies 3325 can be adjusted together with the buoyancy force of the floating bodies 3326.

(3) A specific example of the downward-opening check valve case will now be described referring to FIGS. 18 and 19.

FIG. 18 is a perspective view of an downward-opening check valve case 35 and FIG. 19 is a side elevational view of an downward-opening check valve case 35, where in FIGS. 18 and 19 the same portion are assigned the same reference numerals. In these figures, the downward-opening check valve case is shown in a state where it is detached from the apparatus as with the case of the aforementioned upward-opening check valve case and the cover plates of both sides are detached to see the inside of the downward-opening check valve case. After the downward-opening check valve case is incorporated into the sphere circulating apparatus, the cover plates on the both sides are screwed to the valve case through a packing to seal the inside and the inside of the downward-opening check valve case is kept in the sealed state, so that no air is taken in even under a low air pressure, where the cover plates are not shown here either.

The downward-opening check valve case 35 as a valve case 351 integrally formed of e.g. synthetic resin. As shown, on the upper portion of the valve case 351 a pipe coupler 352 to be coupled with the lower portion of the falling pipe is provided, and on a lower side of the valve case 351 a pipe coupler 353 to be coupled with the upper portion of the falling pipe is provided.

Furthermore, in the valve case 351, a valve open space portion 354 is formed as shown. An upper side plane of the valve open space portion 354 forms an oblique plane inclined by approximately 45 degrees, where at a substantial middle of the upper side plane there is provided an aperture for a cylindrical falling space portion 357 communicating with the falling pipe coupled with the pipe coupler 352.

For a pipe coupler 353 provided on the lower side of the valve case 351 a cylindrical falling space portion 358 communicating with the valve open space portion 354 is provided. The falling space portion 358 is connected with the falling pipe coupled with the pipe coupler 353. Each of the falling space portions 357 and 358 has an inner diameter enabling the sphere to naturally fall.

In order for the valve body 355 to be able to close or open the aperture of the falling space portion 357 formed on the upper side plane of the valve open space portion 354, the valve body 355 is freely rotatably journaled on the upper portion of the upper side planes. After the downward-opening check valve case 35 is incorporated into the sphere circulating apparatus to circulate the sphere within the apparatus, in order that the valve body 355 of the downward-opening check valve case 35 is closed except the case where the sphere is passing therethrough, a magnet member 356 is attached to either of the upper side plane of the valve open space portion 354 and the valve body 355, so that by the attractive force the aperture of the falling space portion 357 is closed with the valve body 355.

The magnet member 356 attached to either of the upper side planes of the valve open space portion 354 and the valve body 355 is selected to have such an attractive force that allows the valve body 355 to be opened by the motion force of the falling sphere in the falling pipe and to be quickly closed after the sphere has passed through the valve open space portion 354.

While as shown in FIG. 19 the center of the aperture provided in the upper side planes of the valve open space portion 354 is matched with the center line of the lower end aperture of the upper side falling pipe coupled with the pipe coupler 352, the center line of the upper end aperture of the lower side falling pipe coupled with the pipe coupler 353 is displaced from the center line of the lower end aperture of the upper side falling pipe. This is because when the falling sphere pushes and opens the valve body 355, the sphere is guided to the lower side falling pipe by the valve body 355, thereby diving into the upper end aperture of the lower side falling pipe.

The circulating operation of the sphere in the sphere circulating apparatus E in FIGS. 9 and 10 using the upward-opening check valve case and the downward-opening check valve case having been described above will now be described.

The procedure forming the first and the second water surfaces within the sphere circulating apparatus E is the same as that of the sphere circulating apparatus D according to the third embodiment shown in FIG. 7, so that at first the seal plug 31-1 on the top of the water storage pipe 31 is detached, the three-way valve 42-3 is operated in the direction of connecting the water supply port to the external atmosphere and the water is not supplied to the water supply port from the automatic water supply device 42; the water is not drained by closing the drain valve 40 and the gate valve 38 is operated to the closed state, thereby closing the lower portion of the falling pipe 34-3.

The water inpoured from the top of the water storage pipe 31 is stored at first in the communication chamber d2. As the water level of the communication chamber d2 rises and reaches the lower end of the guide piece 39-3, there is a sealed space in the lower portion of the falling pipe 34-3, so that the water level does not rise beyond the lower end of the guide piece 39-3, where the second water surface at the water level h2 is formed.

As the water supply from the top of the water storage pipe 31 continues, with the second water surface being held at the lower portion of the falling pipe 34-3 the water level in the water storage pipe 31 and the water levels in the rising pipes 32-5, 32-4, 32-3, 32-2 and 32-1 rise at the same speed, at which time the air in each rising chamber is released via the three-way valve 42-3 to the outside.

When the water level reaches the upper end aperture of the rising pipe 32-1, the water supply from the top of the water storage pipe 31 is stopped, the seal plug 31-1 is attached to the water supply port and the upper portion of the water storage pipe 31 is sealed. Then, the three-way valve 42-3 is operated in the direction of supplying the water to the water supply port from the automatic water supply device 42, whereby at the upper end aperture of the rising pipe 32-1 the first water surface at the water level h1 is formed.

After the first and second water surfaces are thus formed in the sphere circulating apparatus E, a plurality of spheres prepared are sequentially inserted from the insertion port 36 at intervals within the falling pipe 34-3. The spheres having naturally fallen sequentially dive into the second water surface by the motion energy of the spheres, proceeds to the communication chamber d2 by being guided along the guide plate 39-1, enters into the lower end aperture of the rising pipe 32-5 and then rises.

The rising spheres open each valve body of the upward-opening check valve cases 33-4, 33-3, 33-2 and 33-1 and pass through each valve body sequentially, where after the spheres have passed, each valve body is automatically closed. Then, the rising spheres reach the first water surface at the upper end aperture of the rising pipe 32-1. At this time, as above described, the water level of the first water surface is lowered but the water of the automatic water supply device 42 is supplied from the water supply port, whereby the first water surface is maintained at the position of the upper end aperture of the rising pipe 32-1.

As a sequence of a plurality of spheres having thus reached the first water surface at the upper end aperture of the rising pipe 32-1 one after another, among the spheres having reached the first water surface the sphere at an upper position is pushed up, rolled into the upper end aperture of the falling pipe 34-1 through the communication pipe 41-1 and freely fallen in the falling pipe 34-1.

The falling spheres in the falling pipe 34-1 open the valve body of the downward-opening check valve case 35-1. When the spheres have fallen into the upper end aperture of the falling pipe 34-2, the valve body of the downward-opening check valve case 35-1 is automatically closed. Then, the sphere falls in the falling pipe 34-2 and opens the valve body of the downward-opening check valve case 35-2. When the spheres fall into the upper end aperture of the falling pipe 34-3, the valve body of the downward-opening check valve case 35-2 is automatically closed. Then, the spheres freely fall in the falling pipe 34-3 and dive into the second water surface, after which the spheres are guided by the guide plate 39-1 again to the rising pipe 32-5 and rise toward the first water surface.

Thus, in the sphere circulating apparatus E the valve body of either of the downward-opening check valve cases 35-1 and 35-2 is closed while the spheres are falling, so that with the effects by the upward-opening check valve cases 33-1 to 33-4, the water in the rising pipes 32-1 to 32-5 is prevented from dropping. Also, by the repetition of the spheres naturally falling from the first water surface higher in water level into the second water level lower in water level and rising from the second water surface into which the spheres have dived to the first water surface by the buoyancy force, the spheres can be circulated in the apparatus, thereby extracting the motion energy of the spheres without particularly supplying energy for the circulation from the outside.

(Electric Power Generation Example by Sphere Circulating Apparatus)

While specific examples of the sphere circulating apparatus have been described as above referring to FIGS. 9-19, an electric power generation example where this sphere circulating apparatus is employed and an impeller for generating electric power by using the falling motion energy of the sphere is incorporated will be described referring to FIG. 20.

Figure 20:
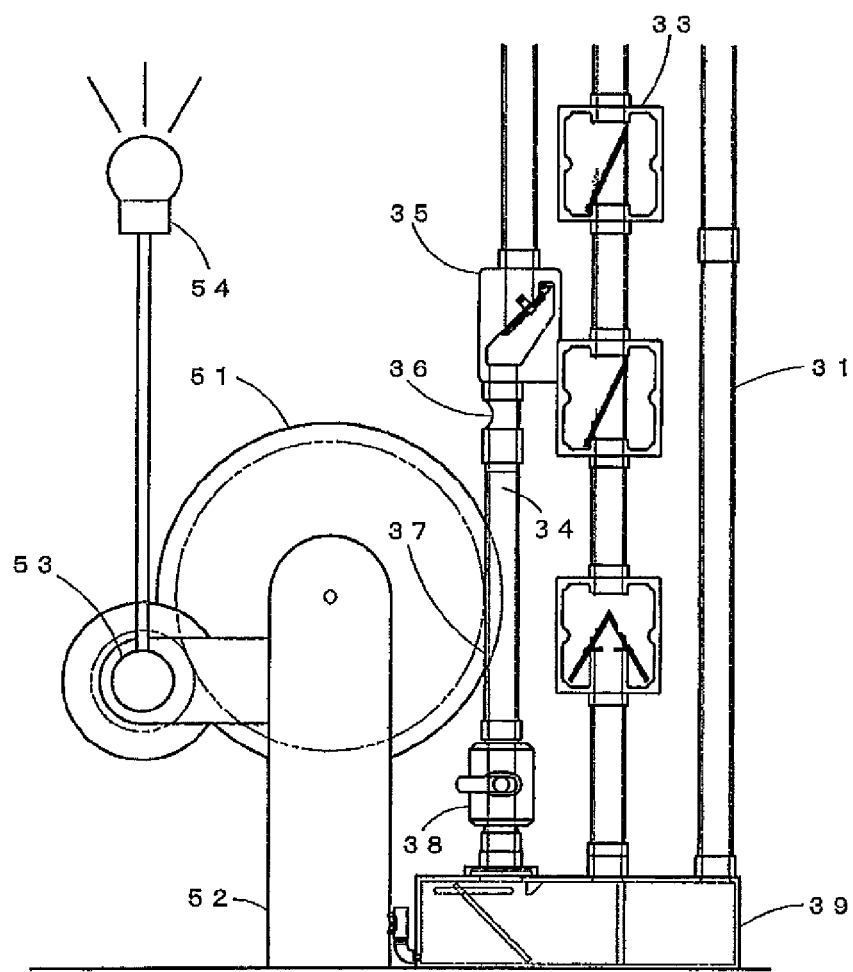
FIG. 20 is a partial side elevational view for illustrating a case where an impeller is combined in the specific example of the sphere circulating apparatus for generating electric power by using a falling motion energy of a sphere.

For this electric generation example the sphere circulating apparatus E shown in FIG. 10 is used, where in FIG. 20 only a lower half of the sphere circulating apparatus is shown while the upper half thereof is not shown. As shown in FIG. 20 a part of blade of an impeller 51 rotatably supported by a supporting post 52 is inserted into a slit 37 provided in the falling pipe 34-3, so that the spheres having fallen from the upper end aperture of the falling pipe 34-3 strike the blade to rotate the impeller 51.

A generator 53 is mounted on a side post laterally extending from the supporting post 52 and acquires, through an auxiliary wheel rotating in corporation with the impeller 51, a rotation speed of six times the impeller 51 for the electric power generation. The electric power thus acquired can be supplied to e.g. lighting equipment 54 as shown. It is to be noted that if the rotation of the impeller 51 provides a sufficient electric power generation, such an auxiliary wheel may not be used.

According to this electric power generation example, taking advantage of enabling the circulation of a plurality of spheres within the apparatus as far as the water is continued to be supplemented without particularly supplying an external energy, motion energies by free falls of the sphere can be extracted as an electric power, so that no emission of $CO_2$ can serve for global warming prevention and contribute to measures for resource saving, energy saving or the like.

While in the example of the electric power generation shown in FIG. 20 a slit is provided in the falling pipe communicating with the atmosphere, into which the blade of the impeller is inserted, for extracting a motion energy of the spheres falling in a falling pipe not communicating with the atmosphere, e.g. the falling pipe 34-1 such a cover body as containing the whole of the impeller 51 may be integrally formed with the falling pipe.

While in the above specific example the outer diameter of the sphere is assumed to be 4.2 cm, the size of the sphere can be properly modified, depending on the outer diameter of the rising pipe and the falling pipe. Also, the iron ball included in the sphere may have a radius allowing it to freely move within the sphere shell, and the material thereof is not limited to iron but may be one with a weight allowing the sphere to dive into the water surface upon falling.

It is also to be noted that the present invention is not limited by the above-mentioned embodiments or examples, and it is obvious that various modifications may be made by one skilled in the art based on the recitation of the claims.

What is claimed is:

1. A sphere circulating apparatus comprising:
    a liquid storage chamber having a seal plug at an upper end portion and a lower end aperture at a lower end portion, in which the chamber is filled with liquid up to at least a predetermined height;
    a rising chamber in which the liquid is held up to an upper end aperture of an upper end portion of the rising chamber at the predetermined height to form a first liquid surface and a plurality of spheres, each having a predetermined weight, fed from a lower end aperture at a lower end portion of the rising chamber are sequentially passed through at least two upward-opening check valves arranged at intervals and risen up to the upper end aperture;
    a falling chamber having an upper end aperture at an upper end portion connected to the upper end aperture of the rising chamber through a first communication chamber, thereby allowing the spheres sequentially fed from the upper end aperture of the rising chamber to naturally fall up to a lower end aperture of a lower end portion of the falling chamber;
    a liquid storage box having a second communication chamber mutually communicating the lower end apertures of the liquid storage chamber, the rising chamber and the falling chamber to form, at the lower aperture of the falling chamber, a second liquid surface into which the spheres having fallen within the falling chamber dive, guide means for sequentially guiding the spheres dived to the lower end aperture of the rising chamber and a drain port aligned with a level of the second liquid surface in side walls of the box; and
    a supply pipe connected to the upper end portion of the rising chamber to automatically supply liquid to the upper end portion of the rising chamber from a liquid supply device when a level of the first liquid surface is lowered; wherein each of the spheres rises by a buoyancy force within the rising chamber, so that the rising spheres are pushed up beyond the upper end aperture of the rising chamber by buoyancy forces of other spheres and fed to the upper end aperture of the falling chamber, where the spheres fed naturally fall within the falling chamber, dive under the second liquid surface and are then fed to the lower end aperture of the rising chamber by the guide means whereby each of the spheres is sequentially circulated between the rising chamber and the falling chamber.

2. The sphere circulating apparatus as claimed in claim 1, wherein the falling chamber has at least two downward-opening check valves arranged at intervals, and the spheres sequentially fed from the upper end aperture of the rising chamber naturally fall up to the lower end aperture of the falling chamber by passing through each of the downward-opening check valves.

3. The sphere circulating apparatus as claimed in claim 2, wherein the upward-opening check valves are opened by the buoyancy forces of the spheres rising while being normally closed and the downward-opening check valves are opened by a falling motion of the spheres while being normally closed.

4. The sphere circulating apparatus as claimed in claim 1, wherein the liquid storage box includes a drain device draining liquid out of the liquid storage box through the drain port when the second liquid surface rises as the spheres dive.

5. The sphere circulating apparatus as claimed in claim 1, wherein the guide means has a guide plate guiding the spheres having dived under the second liquid surface held within the liquid storage box from the lower end aperture of the falling chamber toward the lower end aperture of the rising chamber, and a blocking plate blocking the spheres having dived from entering into the lower end aperture of the liquid storage chamber.

6. The sphere circulating apparatus as claimed in claim 1, further comprising an insertion port inserting the spheres within the falling chamber provided between the downward-opening check valve arranged on a lower side and the lower end portion of the falling chamber and at a height at least enabling the spheres to dive under the second liquid surface.

7. The sphere circulating apparatus as claimed in claim 1, wherein a magnitude of the buoyancy force of each sphere within the rising chamber is determined by the predetermined weight and a volume of each sphere.

8. The sphere circulating apparatus as claimed in claim 7, wherein each sphere has a hollow spherical shell made of synthetic resin in which a metal ball is contained in a freely movable manner.

9. The sphere circulating apparatus as claimed in claim 2, further comprising a rotary blade driven by a falling motion of each sphere set up between the downward-opening check valve on a lower side in the falling chamber and the lower end portion of the falling chamber.

10. The sphere circulating apparatus as claimed in claim 1, further comprising a rotary blade driven by a falling motion of each sphere housed inside a cover body integrally formed with the falling chamber.

* * * * *